US009738248B2

(12) United States Patent
Dingman et al.

(10) Patent No.: US 9,738,248 B2
(45) Date of Patent: Aug. 22, 2017

(54) WEB POSITION ADJUSTMENT AND ATTENUATION APPARATUS

(71) Applicant: Indiana Mills & Manufacturing, Inc., Westfield, IN (US)

(72) Inventors: Guy R. Dingman, Westfield, IN (US); Jeffrey A. King, Markleville, IN (US); James T. Anthony, Zionsville, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 15/338,854

(22) Filed: Oct. 31, 2016

(65) Prior Publication Data

US 2017/0043744 A1 Feb. 16, 2017

Related U.S. Application Data

(63) Continuation of application No. 14/811,455, filed on Jul. 28, 2015, now Pat. No. 9,499,121.

(60) Provisional application No. 62/080,731, filed on Nov. 17, 2014.

(51) Int. Cl.
*B60R 22/20* (2006.01)
*B60R 22/28* (2006.01)
*B60R 22/24* (2006.01)
*B60R 22/46* (2006.01)
*B60R 22/18* (2006.01)

(52) U.S. Cl.
CPC ............ *B60R 22/28* (2013.01); *B60R 22/201* (2013.01); *B60R 22/24* (2013.01); *B60R 22/46* (2013.01); *B60R 2022/1818* (2013.01); *B60R 2022/286* (2013.01)

(58) Field of Classification Search
CPC ............ B60R 22/18; B60R 2022/1812; B60R 2022/1818; B60R 2022/1831; B60R 2022/1843; B60R 22/185; B60R 22/20; B60R 22/201; B60R 22/206
USPC ..... 280/801.2; 297/468, 471, 473, 476, 482, 297/483
See application file for complete search history.

(56) References Cited

U.S. PATENT DOCUMENTS

| | | | |
|---|---|---|---|
| 4,834,427 A * | 5/1989 | Takada | B60R 22/203 280/801.2 |
| 5,165,719 A | 11/1992 | Yano | |
| 5,203,588 A | 4/1993 | Watanabe et al. | |
| 5,205,588 A * | 4/1993 | Yamaoka | B60R 22/202 280/801.2 |
| 5,692,780 A | 12/1997 | Yasui | |

(Continued)

*Primary Examiner* — Toan To
(74) *Attorney, Agent, or Firm* — Barnes & Thornburg LLP

(57) ABSTRACT

A web position and attenuation apparatus includes an elastically deformable body having a first end and a second end opposite the first end, one of the first and second ends configured to be affixed to a frame of a movable vehicle, a web coupling member received on the elastically deformable body, the web coupling member movable relative to, and positionable along, the elastically deformable body, the web coupling member defining a web slot, and a flexible web extending through the web slot, the flexible web part of a restraint system to restrain an occupant of a vehicle seat mounted within the vehicle. The elastically deformable body is responsive to dynamic loads applied by the occupant through the flexible web to the web coupling member to absorb energy and attenuate tension in the flexible web via elastic deformation of the elastically deformable body.

20 Claims, 14 Drawing Sheets

(56) References Cited

U.S. PATENT DOCUMENTS

| | | |
|---|---|---|
| 5,769,456 A | 6/1998 | Juchem et al. |
| 6,145,881 A | 11/2000 | Miller, III et al. |
| 6,260,884 B1 | 7/2001 | Bittner et al. |
| 9,499,121 B2 * | 11/2016 | Fujii .................... B60R 22/201 |
| 2003/0038525 A1 | 2/2003 | Pond et al. |
| 2005/0167970 A1 | 8/2005 | Desmarais et al. |
| 2005/0189758 A1 | 9/2005 | Zierle et al. |
| 2010/0038954 A1 | 2/2010 | Chen et al. |
| 2013/0313814 A1 | 11/2013 | Marziani |
| 2014/0312677 A1 | 10/2014 | Bostrom et al. |
| 2014/0367946 A1 | 12/2014 | Osterhout |
| 2016/0257284 A1 * | 9/2016 | Farooq .................... B60R 22/28 |

\* cited by examiner

WEB POSITION ADJUSTMENT AND ATTENUATION APPARATUS

CROSS-REFERENCE TO RELATED APPLICATION

This patent application is a continuation of U.S. application Ser. No. 14/811,455, filed Jul. 28, 2015, which claims the benefit of, and priority to, U.S. Provisional Patent Application Ser. No. 62/080,731, filed Nov. 17, 2014, the disclosures of which are incorporated herein by reference.

FIELD OF THE INVENTION

The present invention relates generally to apparatuses for restraining occupants in moving vehicles, and more specifically to such apparatus which include web position adjustment and web attenuation features.

BACKGROUND

Conventional restraint systems typically include one or more webs, tethers or belts configured to restrain one or more occupants seated on a seat, bench or chair in a moving vehicle. Some such restraint systems may include one or more web height adjustment devices for adjusting a position of a shoulder restraint web relative to a shoulder, neck and/or head of the occupant. Other such restraint systems may include an attenuation device or apparatus for attenuating peak loading on one or more of the webs, tethers or belts when locked in position by, for example, a locking web retractor. It is desirable in some restraint system implementations to include both a web height adjustment and a web attenuation feature.

SUMMARY

The present invention may comprise one or more of the features recited in the attached claims, and/or one or more of the following features and combinations thereof. In a first example aspect, a web position and attenuation apparatus may comprise an elongated body extending in a longitudinal direction between opposite ends thereof, a first bracket mounted to one of the opposite ends of the elongated body and configured to be affixed to a frame of a movable vehicle, a web coupling member slidably received on the elongated body and positionable along the elongated body, the web coupling member defining a first web slot, and a flexible web extending through the first web slot, the flexible web configured to restrain an occupant of a vehicle seat mounted within the vehicle. The elongated body may attenuate forces applied by the flexible web to the web coupling member in non-parallel directions relative to the longitudinal direction by elastically deforming in the non-parallel directions.

A second example aspect includes the subject matter of the first example aspect and further includes a second bracket mounted to the other of the opposite ends of the elongated body and configured to be affixed to the frame of the movable vehicle.

A third example aspect includes the subject matter of either of the first and second example aspects and wherein the elongated body comprises a planar body defining a planar surface on at least one face thereof that extends in the longitudinal direction between the opposite ends thereof, and wherein the non-parallel directions in which the elongated body is elastically deformable are non-parallel directions relative to the first planar surface in an area of the planar body at which the web coupling member is positioned.

A fourth example aspect includes the subject matter of the third aspect and wherein the planar surface extends between opposite sides of the planar body and defines a transverse direction between the opposite sides, and wherein the first web slot comprises an elongated slot extending in a direction parallel to the transverse direction adjacent to the planar surface.

A fifth example aspect includes the subject matter of the fourth aspect and wherein the elongated body is vertically oriented with the one of the opposite ends of the elongated body positioned above the other of the opposite ends of the elongated body, and wherein the first bracket defines a second web slot therethrough, the flexible web extending through the second web slot, downwardly along the planar surface of the elongated member between the second web slot and the web coupling member, and through the first web slot of the web coupling member.

A sixth example aspect includes the subject matter of the fifth example aspect and wherein one end of the flexible web extending from the second web slot is affixed to the first bracket and an opposite end of the flexible web extending from the first web slot is configured to be affixed to the vehicle seat.

A seventh example aspect includes the subject matter of the fifth example aspect and further includes a locking web retractor configured to be mounted to the vehicle, and wherein one end of the flexible web extending from the second web slot is attached to a rotatable spool of the web retractor and an opposite end of the flexible web extending from the first web slot is configured to be affixed to the vehicle seat.

In an eighth example aspect, a web position and attenuation apparatus may comprise an elongated body having a first end, a second end opposite the first end and a first surface extending longitudinally between the first and second ends with a plurality of longitudinally spaced-apart protrusions extending therefrom, a first bracket mounted to the first end of the elongated body and configured to be affixed to a frame of a movable vehicle, a second bracket mounted to the second end of the elongated body and configured to be affixed to the frame of a movable vehicle, and a web coupling member slidably received on the elongated body and defining a web slot configured to receive a flexible web therethrough for restraining an occupant of a vehicle seat mounted within the vehicle, the web coupling member discretely positionable longitudinally along the elongated body between adjacent ones of the plurality of spaced-apart protrusions. The elongated body may be elastically deformable in non-parallel directions relative to the first surface in an area of the elongated body in which the web coupling member is discretely positioned to attenuate forces applied in the non-parallel directions to the web coupling member.

A ninth example aspect includes the subject matter of the eighth example aspect and wherein the web coupling member defines an opening sized to slidably receive the elongated body therethrough, the elongated body longitudinally movable relative to the opening to discretely position the opening between adjacent ones of the plurality of spaced-apart protrusions.

A tenth example aspect includes the subject matter of the ninth example aspect and wherein the each of the plurality of protrusions is sized to abut the web coupling member adjacent to at least a portion of the opening defined therethrough, and wherein at least one of the web coupling member and each of the plurality of protrusions is elastically deformable to allow forced passage thereby of the web coupling member as the web coupling member is longitudinally moved along the elongated body to one of a plurality of discrete positions each defined between different adjacent ones of the plurality of protrusions.

An eleventh example aspect includes the subject matter of the tenth example aspect and wherein the elongated body comprises an elongated planar strip with the first surface being a first planar surface and the elongated planar strip having a second planar surface opposite the first planar surface, each of the first and second planar surfaces having a length defined between the first and second ends of the elongated body and a width defined between opposite sides of the elongated planar strip, and wherein the web slot comprises a first linear slot adjacent to the first or the second planar surface of the elongated body and extending transversely relative to the width of the first or the second planar surface.

A twelfth example aspect includes the subject matter of the eleventh example aspect and wherein at least one of the plurality of protrusions comprises a rib normal to a plane defined by the first planar surface and extending across the width of the first planar surface.

A thirteenth example aspect includes the subject matter of either of the eleventh and the twelfth example aspects and further includes at least one protrusion extending from the second planar surface of the elongated planar strip.

A fourteenth example aspect includes the subject matter of any of the eleventh, twelfth and thirteenth example aspects and wherein the opening defined through the web coupling member comprises a second linear slot parallel with the first linear slot.

In a fifteenth example aspect, a web position and attenuation apparatus may comprise an elongated body extending in a longitudinal direction between a first end a second end thereof, the second end opposite the first end, a mounting pin extending transversely through the elongated body at or near the first end thereof, a first bracket defining a pair of channels sized to receive therein opposite ends of the mounting pin such that the first end of the elongated body is pivotable relative to the first bracket about the mounting pin, the first bracket configured to be affixed to a frame of a movable vehicle, and a web coupling member slidably received on the elongated body and positionable along the elongated body, the web coupling member defining a first web slot configured to receive a flexible web therethrough for restraining an occupant of a vehicle seat mounted within the vehicle. The elongated body may be elastically deformable in non-parallel directions relative to the longitudinal direction of the elongated body to attenuate forces applied in the non-parallel directions to the web coupling member.

A sixteenth example aspect includes the subject matter of the fifteenth example aspect and further includes a second bracket attached to the second end of the elongated body and configured to be affixed to the frame of a movable vehicle, the elongated body elastically deformable between the first and second brackets.

A seventeenth example aspect includes the subject matter of either of the fifteenth and sixteenth example aspects and wherein the elongated body is vertically oriented with the first end of the elongated body positioned above the second end of the elongated body, and wherein the first web slot defined by the web coupling member comprises a first elongated slot extending in a transverse direction relative to the longitudinal direction of the elongated body, and wherein the first bracket defines a second elongated web slot parallel with the first elongated slot and configured to receive the flexible web therethrough.

An eighteenth example aspect includes the subject matter of the seventeenth example aspect and further includes the flexible web, the flexible web extending through the second elongated slot, downwardly along a surface of the elongated member between the second web slot and the web coupling member, and through the first elongated slot of the web coupling member.

A nineteenth example aspect includes the subject matter of the eighteenth example aspect and wherein the first end of the flexible web extending from the second elongated slot is affixed to the first bracket and the second end of the flexible web extending from the first elongated slot is configured to be affixed to the vehicle seat.

A twentieth example aspect includes the subject matter of the eighteenth example aspect and further includes a locking web retractor configured to be mounted to the vehicle, and wherein the first end of the flexible web extending from the second elongated slot is attached to a rotatable spool of the web retractor and the second end of the flexible web extending from the first elongated slot is configured to be affixed to the vehicle seat.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
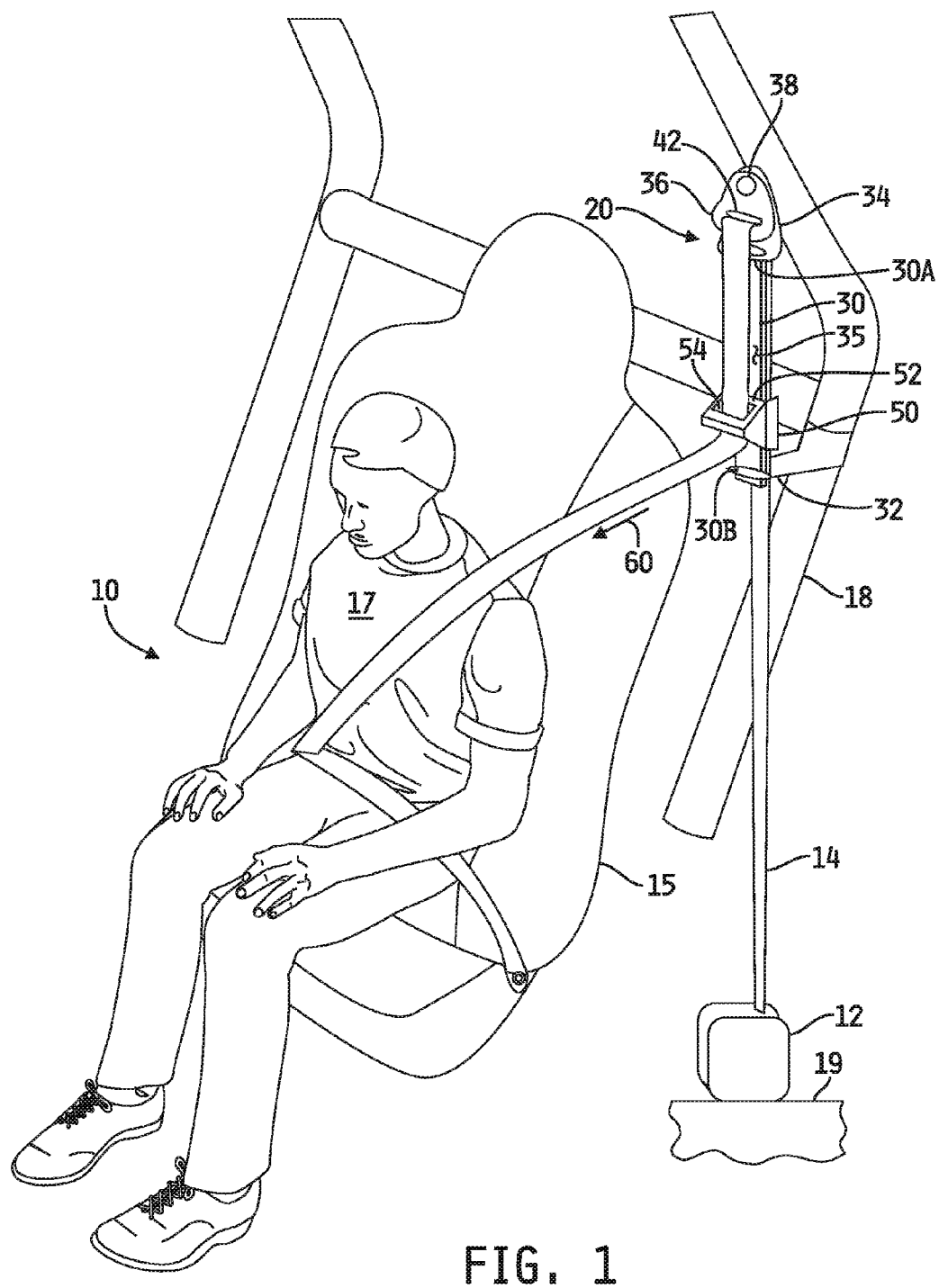
FIG. 1 is a simplified diagram of one embodiment of a web position adjustment and attenuation apparatus for an occupant restraint system shown in a perspective view with the apparatus adjusted to accommodate a relatively short vehicle seat occupant.
Figure 2:
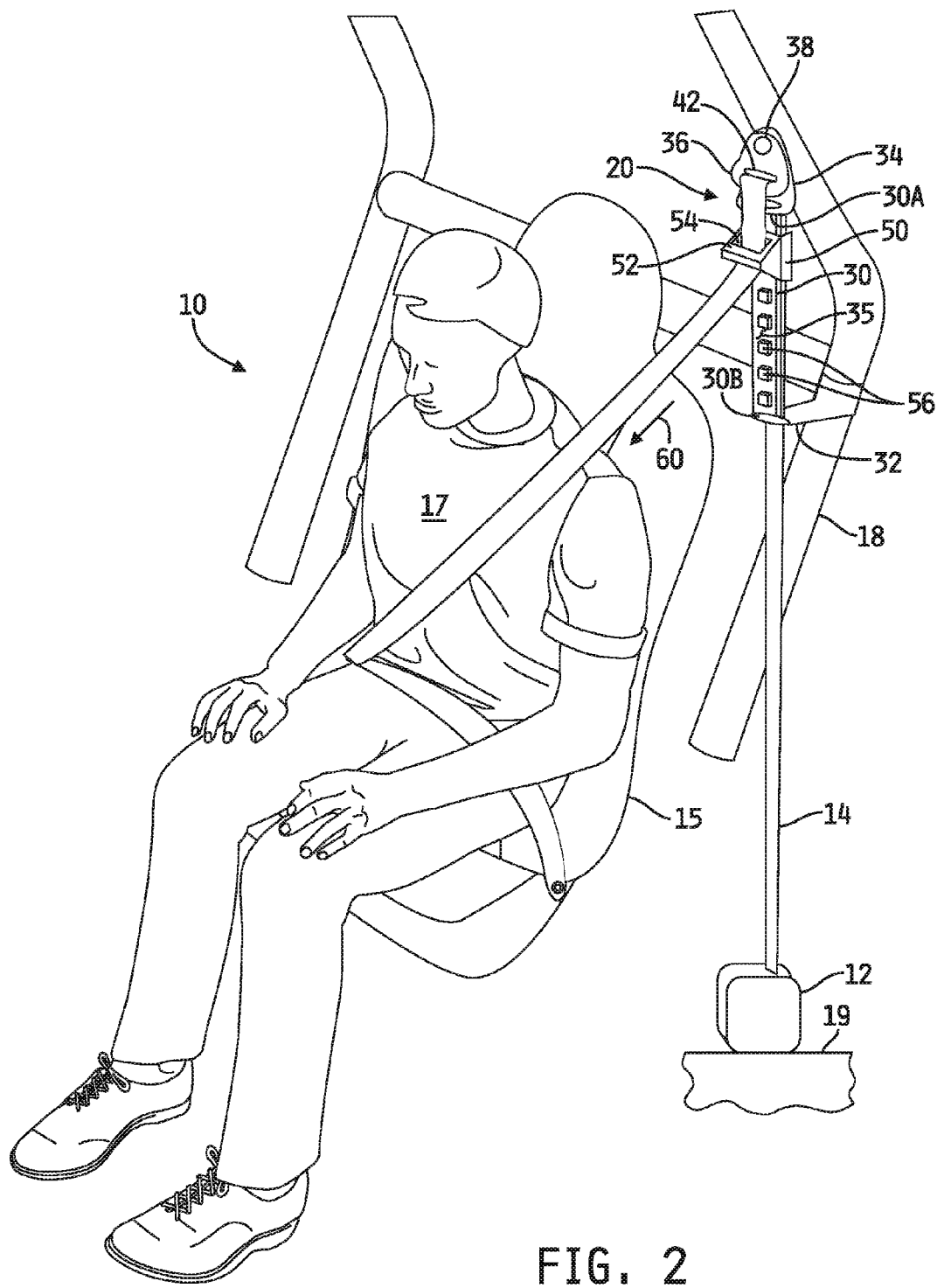
FIG. 2 is a simplified diagram of the apparatus of FIG. 1 shown in the same perspective view with the apparatus adjusted to accommodate a relatively tall vehicle seat occupant.
Figure 3:
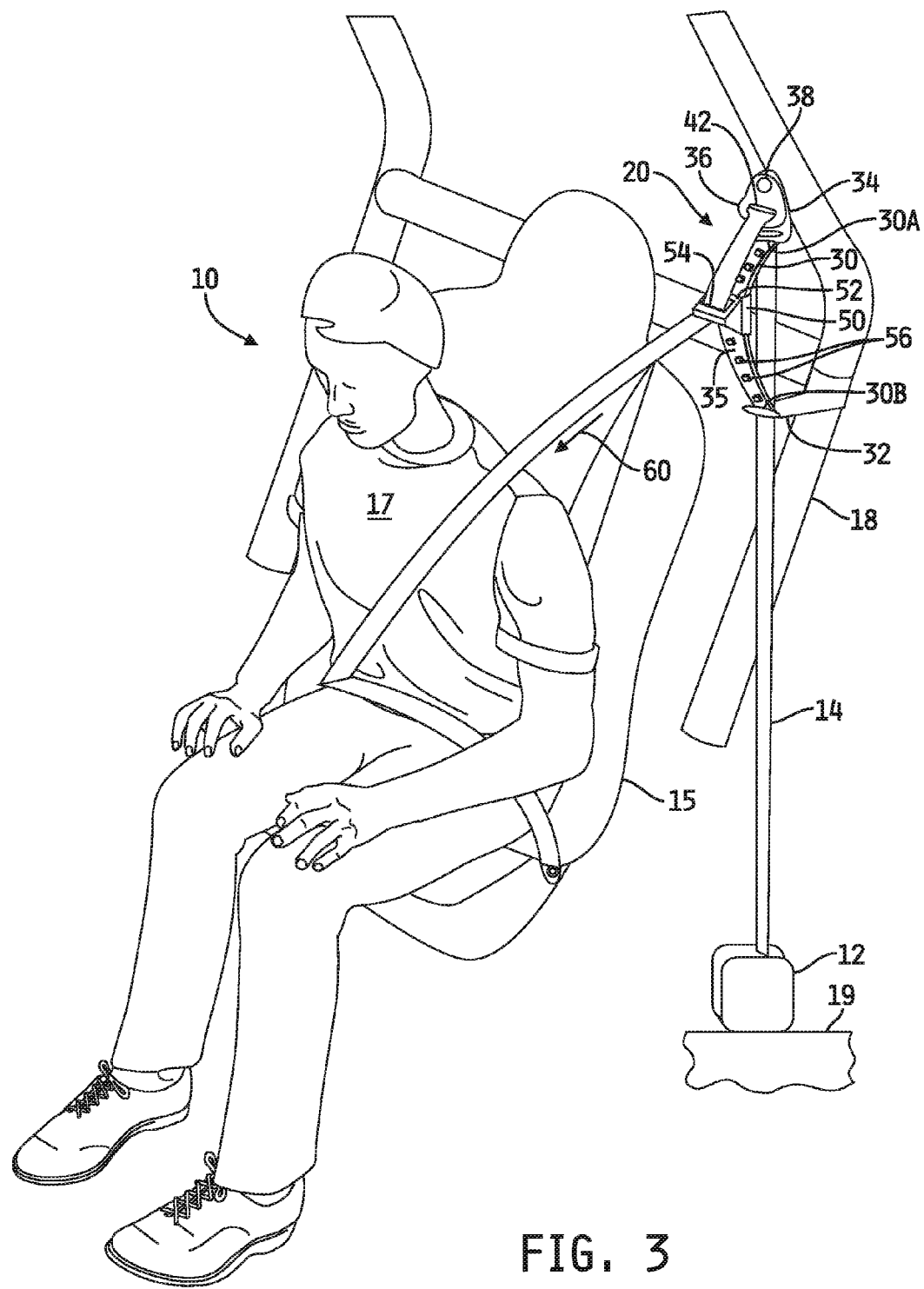
FIG. 3 is a simplified diagram of the apparatus of FIGS. 1 and 2 shown in the same perspective view with the apparatus under dynamic loading conditions.

Referring now to FIGS. 1-3, a simplified diagram is shown of one embodiment of an occupant restraint system 10 for a moving vehicle. The moving vehicle may illustratively be or include any motor or non-motor commercial, non-commercial or recreational vehicle, examples of which may include, but are not limited to, an automobile, a light, mid or heavy duty truck, an emergency vehicle such as a fire truck, ambulance or the like, any type of bus such as a school bus, commercial bus, shuttle bus or the like, a van, a limousine of any type, a commercial or personal watercraft, a recreational vehicle an all-terrain vehicle (ATV), any type of off-road vehicle, electric vehicle of any type, and the like. In the illustrated embodiment, the occupant restraint system 10 is implemented in an off-road vehicle including a vehicle seat 15 in which an occupant 17 is seated, although it will be understood that the occupant restraint system 10 may alternatively be implemented in any of the movable vehicles described in this paragraph.

The occupant restraint system 10 illustrated in FIGS. 1-3 includes a mount 12 affixed to the movable vehicle, e.g., to a floor 19 or portion of a frame 18 of the vehicle, and a flexible web, belt or tether 14 attached at one end to the mount 12. In some embodiments, the mount 12 may be a fixed structure to which the one end of the web 12 is securely attached, and in other embodiments the mount 12 may be or include a conventional web retractor from which the web 12 may be paid out and into which the web 12 may retract under the force of one or more biasing members, e.g., springs. In embodiments in which the mount 12 is a web retractor, the web retractor 12 may be a conventional rotary retractor or linear retractor, and in any case may be a locking retractor or free-spooling. If a locking retractor, the web retractor 12 may illustratively be a conventional inertial locking retractor such as an emergency locking retractor (ELR), a conventional automatic locking retractor (ALR), or other conventional inertial or non-inertial locking retractor. In any case, the opposite end of the web 14 is illustratively attached to a conventional releasable engagement device 16 that is configured for releasable engagement with a correspondingly configured engagement device (not shown) attached to the seat 15 or other support structure, such that the two engagement devices may be selectively engaged, e.g., locked or otherwise attached to each other, and disengaged. Examples of the releasable engagement device 16 include, but are not limited to, a conventional buckle, a conventional tongue, or the like.

In the embodiment illustrated in FIGS. 1-3, the occupant restraint system 10 further includes a web position adjustment and attenuation apparatus 20 that provides for adjustment in the position of the web 14 relative to a shoulder, neck and/or head of the occupant 17 and that further provides for the attenuation of peak loads applied to the web 14 by the occupant 17 under various operating conditions of the vehicle in which the occupant restraint system 10 is mounted. For example, non-uniformities in the terrain being traversed by the vehicle are typically translated through the vehicle suspension and vehicle seat 15 to the vehicle occupant 17 which results in movement of the occupant's body within the vehicle seat 15. Such occupant movement is, in turn, transferred from the occupant's body 17 to the web 14 in the form of dynamic forces applied to the web 14. In embodiments in which the mount 12 is or includes a locking web retractor, the locking web retractor 12 may be previously locked or such dynamic forces applied by the occupant's body 17 to the web 14 cause the locking web retractor 12 to lock, and in either case the length of the web 14 is fixed and generally taught. As will be described in greater detail below, the web position adjustment and attenuation apparatus 20 illustratively includes an elastically deformable structure that provides some amount of dynamic relief in the tension of the web 14 under such conditions so as to attenuate peak loads applied by the occupant 17 through the web 14 to the apparatus 20, the forces of which would otherwise be borne by the occupant 17.

The web position adjustment and attenuation apparatus 20 illustrated in FIGS. 1-3 illustratively includes an elongated body 30 extending between and attached or mounted to opposing brackets 32 and 34 at opposite terminal ends thereof. In the illustrated embodiment, the elongated body 30 is provided in the form of a strip having a planar front surface 35 and an identical planar back surface (not shown) and having a length defined between the terminal ends thereof that is greater than a width defined between opposing sides thereof. The planar front surface 35 is illustratively forward oriented or forward facing, e.g., such that the front surface 35 faces in a forward direction relative to the vehicle as indicated by the arrow 60. It will be understood that such a configuration of the elongated body 30 is shown and described only by way of example, and that this disclosure contemplates other shapes and configurations of the elongated body 30. The brackets 32 and 34 are each configured to be attached or affixed to the vehicle, e.g., to the frame 18 of the vehicle via one or more suitable fixation members, e.g., screws, nut/bolt combinations or the like, and in the illustrated embodiment the bracket 34 is shown affixed to the frame 18 via a single screw or bolt 38.

In the illustrated embodiment, the elongated body 30 is vertically oriented within the vehicle such that the bracket 34 is positioned above, and aligned with, the bracket 32, although other orientations of the elongated 30 are contemplated by this disclosure. Moreover, although both brackets 32 and 34 are illustrated in FIGS. 1-3 as being attached or otherwise mounted to the frame 18 of the vehicle, this disclosure contemplates embodiments in which only one or the other of the brackets 32, 34 is mounted to the frame 18 with the remaining bracket unconnected to the vehicle and/or omitted altogether. Alternatively still, this disclosure contemplates embodiments in which the bracket 32 is mounted or affixed to another structure within the vehicle, such as the vehicle floor 19, side wall, the vehicle seat 15 or other support structure within the vehicle.

Further in the illustrated embodiment, the apparatus 20 is shown mounted to the frame 18 of the vehicle rearwardly of the vehicle seat 15 such that the front surface 35 of the elongated body 30 is positioned generally behind the seat 15.

It will be understood that such a mounting configuration of the apparatus 20 is shown and described only by way of example, and that this disclosure contemplates other embodiments in which the apparatus 20 is mounted and/or positioned in other locations relative to the vehicle seat 15 and/or to the occupant 17, e.g., such as mounted to the vehicle seat 15 and extending upwardly from the rear, front and/or top of the vehicle seat 15.

In the embodiment illustrated in FIGS. 1-3, the top bracket 34 includes a web guide 36 mounted thereto or integral therewith, and in any case the web guide 36 defines a web slot 42 therethrough which is illustratively oriented generally parallel to the direction of the width of the elongated body 30. The web 14 illustratively passes from the mount 12 upwardly toward and along a rear portion of the top bracket 34, through the web slot 42 and then downwardly along a front portion of the top bracket 34 and at least a portion of the front surface of the elongated body 30.

The apparatus 20 further includes a web coupling member 50 defining a slot 52 sized and configured to slidingly receive the elongated body 30 therethrough such that the web coupling member 50 is movable along the elongated body 30, e.g., between one end 30A of the elongated body 30 and an opposite end 30B of the elongated body 30. The web coupling member 50 further defines a web slot 54 therethrough which is illustratively oriented generally parallel to the direction of the width of the elongated body 30. The web 14 emerging from the web slot 42 of the web guide 36 illustratively passes downwardly through the web slot 54 defined through the web coupling member 50 and then forwardly in the vehicle toward the vehicle seat 15 and occupant 17 as shown by the directional arrow 60. In some embodiments, as illustrated by example in FIG. 1, the elongated body 30 and the web coupling member 50 are sized and/or configured (e.g., via material choice) such that the web coupling member 50 is positionable at any of various locations along the elongated body 30 and will remain at any such selected position without additional engagement or restraint structure(s). In other embodiments, as illustrated by example in FIGS. 2 and 3, the elongated body 30 may include a plurality of space-apart protrusions 56 attached to or integral with the front surface 35 (and/or rear surface and/or either or both sides), wherein such protrusions 56 illustratively extend longitudinally along at least a portion of the elongated body 30. In such embodiments, the web coupling member 50 is illustratively engageable with each such protrusion 56 and/or engageable between adjacent ones of the protrusions 56 to set and secure the position of the web coupling member 50 relative to the elongated body 30.

The position of the web coupling member 50 is illustratively positionable along and relative to the elongated body 30 of the web position adjustment and attenuation apparatus 20 in order to establish a top position of the web relative to the vehicle seat 15 and/or occupant 17. In FIG. 1, for example, the web coupling member 50 is positioned adjacent to the lower or bottom end 30B of the elongated body 30 so as to place the web 14 over the shoulder, and illustratively away from the neck, of a relatively smaller/shorter occupant 17. In FIG. 2, in contrast, the web coupling member 50 is positioned adjacent to the upper or top end 30A of the elongated body 30 so as to place the web 14 over the shoulder, and illustratively away from the neck, of a relatively larger/taller occupant 17. In FIG. 3, in further contrast, the web coupling member 50 is positioned adjacent near the middle of the elongated body 30 so as to place the web 14 over the shoulder, and illustratively away from the neck, of a mid-sized occupant 17. Such adjustable positioning of the top position of the web 14 thus allows appropriate positioning of the web 14 relative the shoulders of different sized occupants 17 while also providing the ancillary benefit of avoiding contact between the web 14 and the neck and/or head of the occupant 17.

As illustrated by example in FIG. 3, the elongated body 30 is elastically deformable so as to provide some amount of attenuation in the forward movement of the web 14 and occupant 17 under dynamic loading conditions of the type described above. Illustratively, the elongated body 30 is generally elastically deformable in non-parallel directions relative to the length or longitudinal direction of the elongated body 30 such that the elongated body 30 will dissipate, i.e., absorb, energy resulting from forces applied by the occupant to the web 14 by elastically deforming, e.g., by flexing outwardly in the direction 60, under dynamic loading conditions applied by the web 14 to the web coupling member 50 regardless of the location of the web coupling member 50 relative to the elongated body 30. In embodiments in which the elongated body 30 is provided in the form of a strip with a planar front surface 35 as illustrated by example in FIGS. 1-3, the elongated body 30 is generally elastically deformable in directions normal to the planar front surface 35 and less so, if at all, in directions parallel to the planar front surface 35 and in directions parallel to the length of the elongated body 30. In any case, the elastically deformable elongated body 30 provides some amount of dynamic relief in the tension of the web 14, under conditions in which the occupant 17 applies a forward force, i.e., generally in the direction of the directional arrow 60, to the web 14, by elastically deforming generally in the forward direction 60 as illustrated by example in FIG. 3 to thereby effectively extend the length of the web 14 relative to the stationary brackets 32, 34 and vehicle frame 14 and thus attenuate peak loads applied by the occupant 17 through the web 14 to the apparatus 20.

In one embodiment, elastic deformation of the elongated body 30 is achieved via choice of material from which the elongated body 30 is fabricated. In such embodiments, the elongated body 30 may be constructed partially or entirely of one or more elastomers, such as rubber, although one or more other elastomers and/or one or more other elastically deformable materials may alternatively be used. In other embodiments, the elongated body 30 may be constructed of a rigid or semi-rigid backbone to which an elastically deformable structure or material is attached, affixed or integrally formed.

Referring now to FIGS. 4-7, a simplified diagram is shown of another occupant restraint system 100 for a movable vehicle which includes another embodiment of a web position adjustment and attenuation apparatus 120. In the embodiment illustrated in FIGS. 4-7, the mount 12, web 14, seat 15, occupant 17, frame 18, floor 19 and the vehicle in which the restraint system 100 is mounted are all as described above with respect to FIGS. 1-3. In the embodiment illustrated in FIGS. 4-7, the web position adjustment and attenuation apparatus 120 includes a web guiding bracket 125, a web coupling member 128 and a second web, belt or tether 130. As with the web position adjustment and attenuation apparatus 20, the web position adjustment and attenuation apparatus 120 provides for adjustment in the position of the web 14 relative to a shoulder, neck and/or head of the occupant 17 and further provides for the attenuation of peak loads applied to the web 14 by the occupant 17 under various operating conditions of the vehicle in which the occupant restraint system 10 is mounted. In the embodiment illustrated in FIGS. 4-7, the web position adjustment and attenuation apparatus 120 illustratively automatically adjusts the position of the web 14 relative to the shoulder, neck and/or head of the occupant 17.

In the embodiment illustrated in FIGS. 4-7, the web guiding bracket 125 includes a mounting bracket 122 that is configured to be attached or affixed to the vehicle, e.g., to the frame 18 of the vehicle, via one or more suitable fixation members, e.g., screws, nut/bolt combinations or the like, and in the illustrated embodiment the mounting bracket 122 is shown affixed to the frame 18 via a single screw or bolt 124. A web guide 126 is mounted to or integral with the mounting bracket 122, and in the illustrated embodiment the web guide 126 is provided in the form of a slotted ring such as a D-ring, although the slotted ring may in other embodiments have a shape other than a "D" configuration, examples of which include, but are not limited to, "O" configurations, block "O" configurations, oval configurations, any type of closed polygon configuration, and the like. In any case, the slotted ring 126 is illustratively freely pivotable relative to the mounting bracket 122 such that the slotted ring 126 is pivotable in fore and aft directions relative to the vehicle in which the restraint system 100 is mounted, i.e., toward and away from the vehicle seat 15. A web coupling member or web guide 128 is illustratively also provided in the form of a slotted ring such as a D-ring, although the slotted ring 128 may in other embodiments have a shape other than a "D" configuration, examples of which are provided above with respect to the web guide 126. In any case, the web 14 extends through the web coupling member 128, and the web coupling member 128 is also freely pivotable in fore and aft directions, i.e., toward and away from the vehicle seat 15 as will be described in greater detail below.

The second web 130 in the embodiment illustrated in FIGS. 4-7 is illustratively affixed at one end 132, e.g., via a fixation member or element such as a screw, nut/bolt combination or the like, to the frame 18 of the vehicle in which the web position adjustment and attenuation apparatus 120 is mounted. In alternative embodiments, the end 132 of the web 130 may be affixed to one or more other support structures in the vehicle, such as the floor 19, side wall or other stationary structure within the vehicle. The opposite end 134 of the web 130 is fed through the back side of the web guide 126 and then downwardly toward and through the front or back side of the web coupling member 128 such that the web guide 126 and the web coupling member 128, e.g., both D-rings, are coupled together only by the web 130. The end 134 of the web 130 is illustratively attached to itself, e.g., at a location between the web guide 126 and the web coupling member 128, after passing through the web coupling member 128. The web guide 126 is thus pivotable about the mounting bracket 122 in fore and aft directions relative to the vehicle (e.g. toward and away from the vehicle seat 15 in the direction of the x-axis of the coordinate system superimposed onto FIG. 4) and the coupling member 128 is likewise pivotable about the pocket or loop formed between the end 134 of the web 130 and a portion of the body of the 130 in fore and aft directions relative to the vehicle (e.g. toward and away from the vehicle seat 15 in the direction of the x-axis of the coordinate system superimposed onto FIG. 4).

The web 130 further includes an elastically deformable section 138 about which a section 136 of web is affixed such that either of the elastically deformable section 138 and the section 136, together with the remainder of the web 130, may define the overall length of the web 130. Illustratively, the elastically deformable section 138 is provided in the form of an elastic fabric that has a first length under normal, unstretched conditions and that stretches to a second length that is longer than the first length under tensile load applied to the elastically deformable section 138 along its length, i.e., when load is applied in opposite directions to the terminal ends thereof. The remainder of the web 130 (i.e., on either side of the sections 136 and 138) as with the web 14, is illustratively provided in the form of a pliable fabric, e.g., woven or other construction, which is at least somewhat flexible in one or more directions other than along its length in which it has limited, if any, flexibility, stretch or elongation ability, at least under typical loads experienced by the restraint system 100 during normal operation of the vehicle in which it is mounted. In some embodiments, the section 136 of web is identical in material construction to the web 130, although in other embodiments the material construction of the web section 136 may be different than that of the web 130. In any case, the web section 136, as with the remainder of the web 130 on either side of the section 138, has limited or no elongation or stretch along its length under the typical loads experienced by the restraint system 100 during normal operation of the vehicle in which it is mounted. The lengths of the web section 136 and of the web 130 on either side of the elastically deformable section 138 are therefore substantially set by the no-load lengths thereof, whereas the length of the elastically deformable section 138 is variable between a first length under no tensile load conditions and a second length, greater than the first length, under tensile load. The overall length of the web 130, i.e., between the end 132 and the web coupling member 128, is thus likewise variable between a first length of the web 130 under no tensile load conditions and a second length that is greater than the first length under tensile load. It will be understood that while the elastically deformable section 138 is illustrated in FIGS. 4-7 as being interposed in a section of the web 130 adjacent the end 132 that is secured to the frame 18, the elastically deformable section 138 may alternatively be located anywhere along the web 130. Locating the elastically deformable section 138 between the web guide 126 and the end 132 of the web 130 provides for a high amount of variability in the length of the elastically deformable section 138 thus allowing for a potentially wide selection of elastically deformable materials with different ranges of stretch factors or constants.

Figure 4:
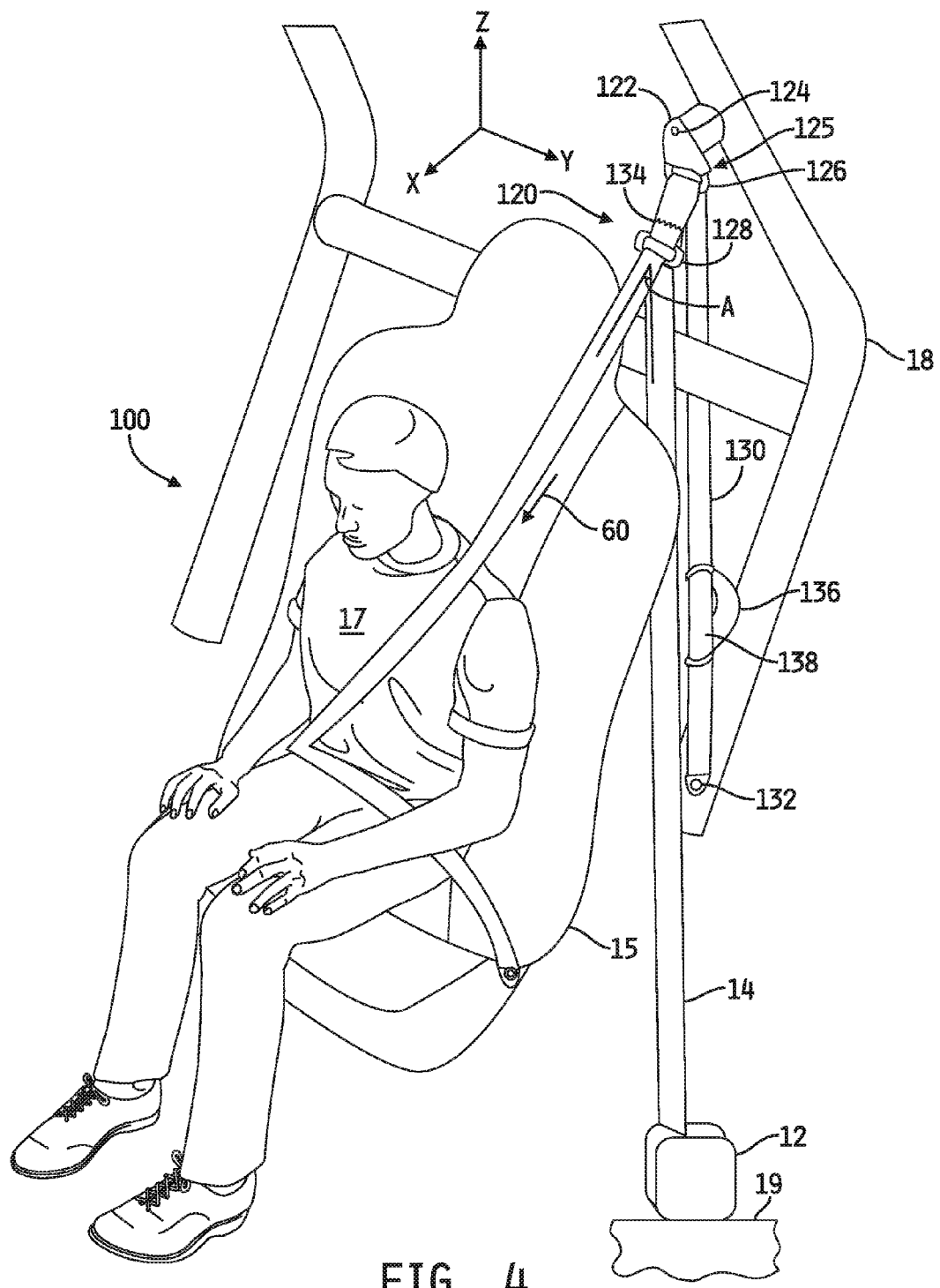
FIG. 4 is a simplified diagram of another embodiment of a web position adjustment and attenuation apparatus for an occupant restraint system shown in a perspective view with the apparatus adjusted to accommodate a relatively short vehicle seat occupant.
Figure 5:
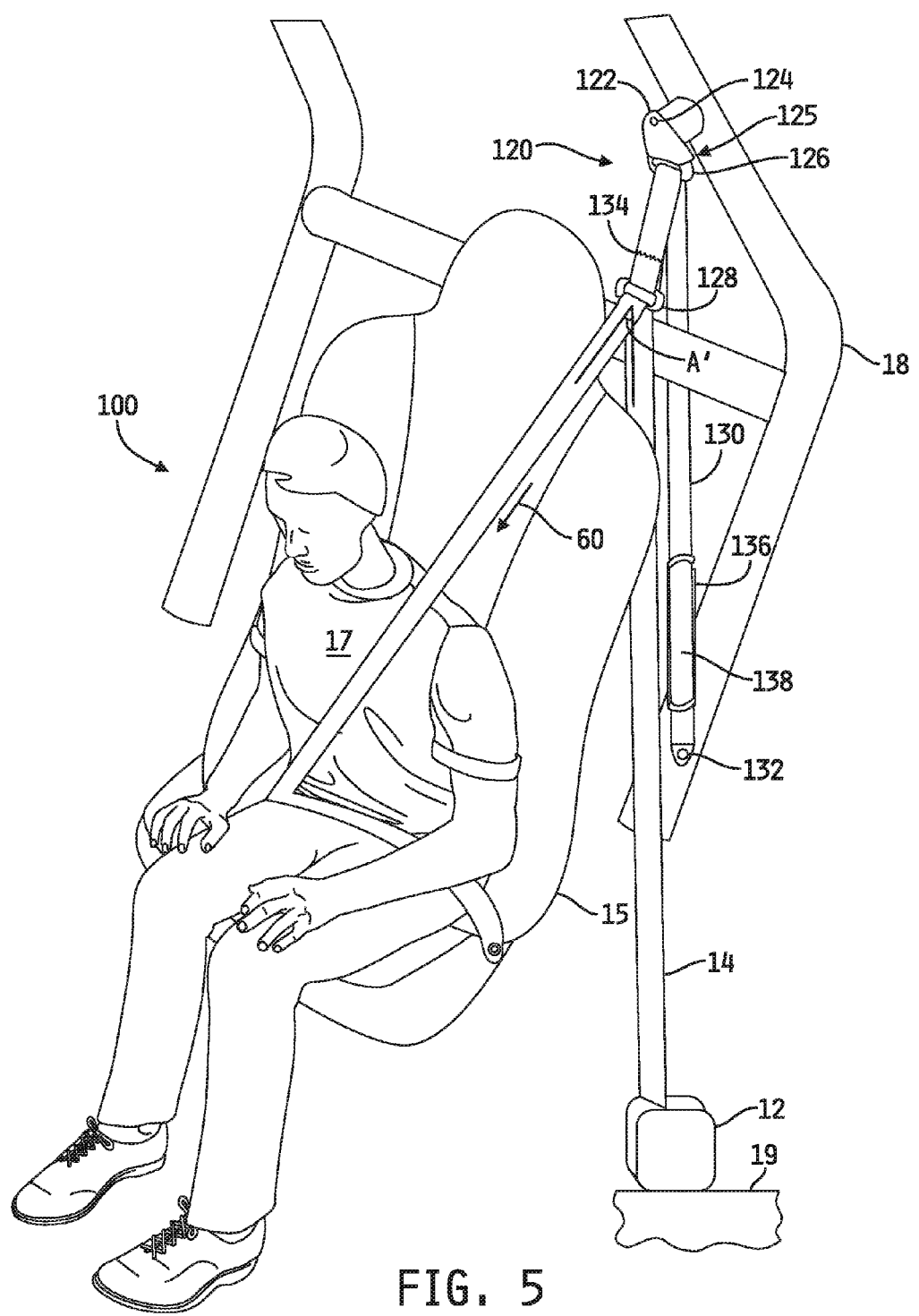
FIG. 5 is a simplified diagram of the apparatus of FIG. 4 shown in the same perspective view with the apparatus under dynamic loading conditions.
Figure 6:
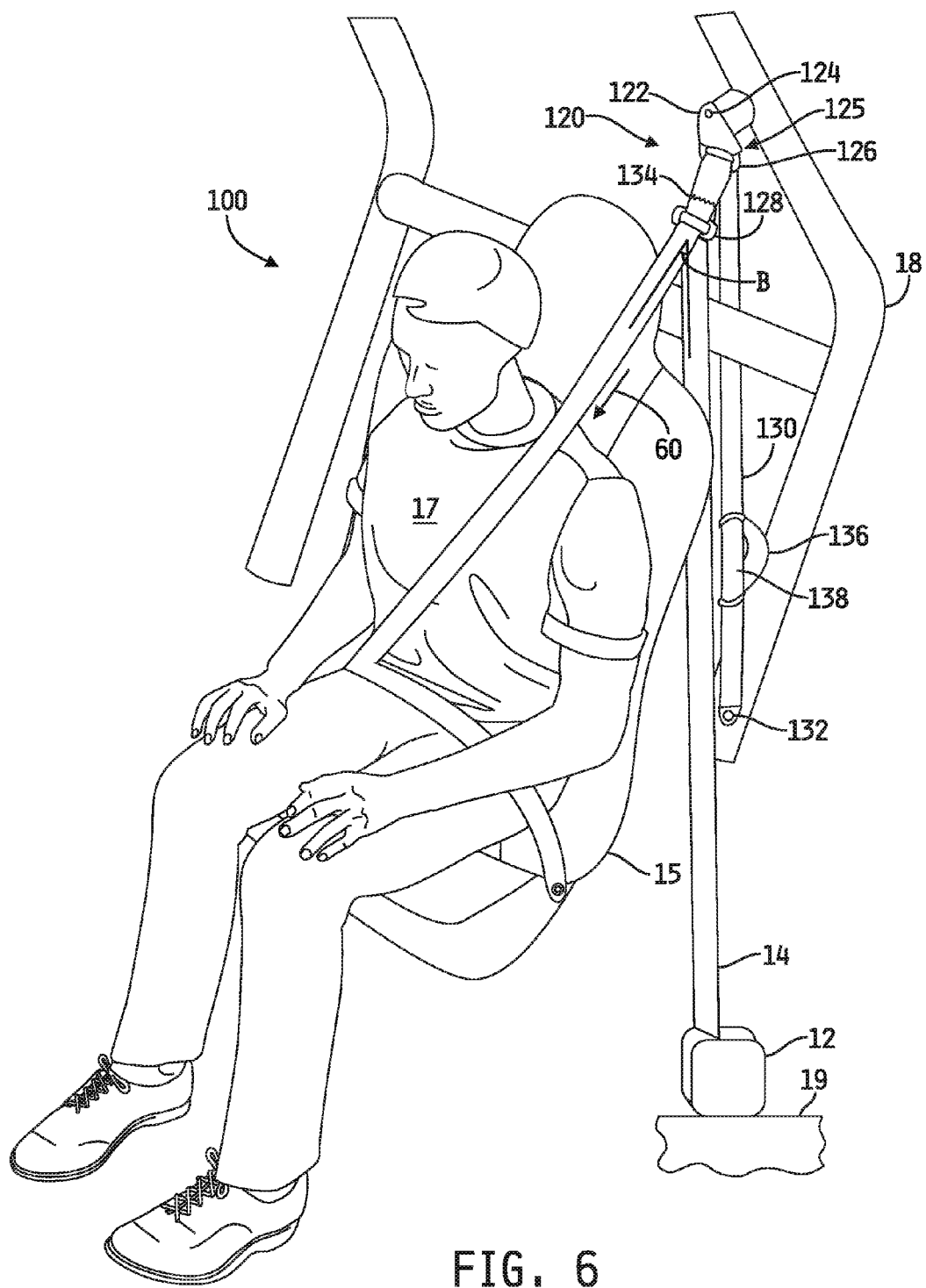
FIG. 6 is a simplified diagram of the apparatus of FIG. 4 shown in the same perspective view with the apparatus adjusted to accommodate a relatively tall vehicle seat occupant.
Figure 7:
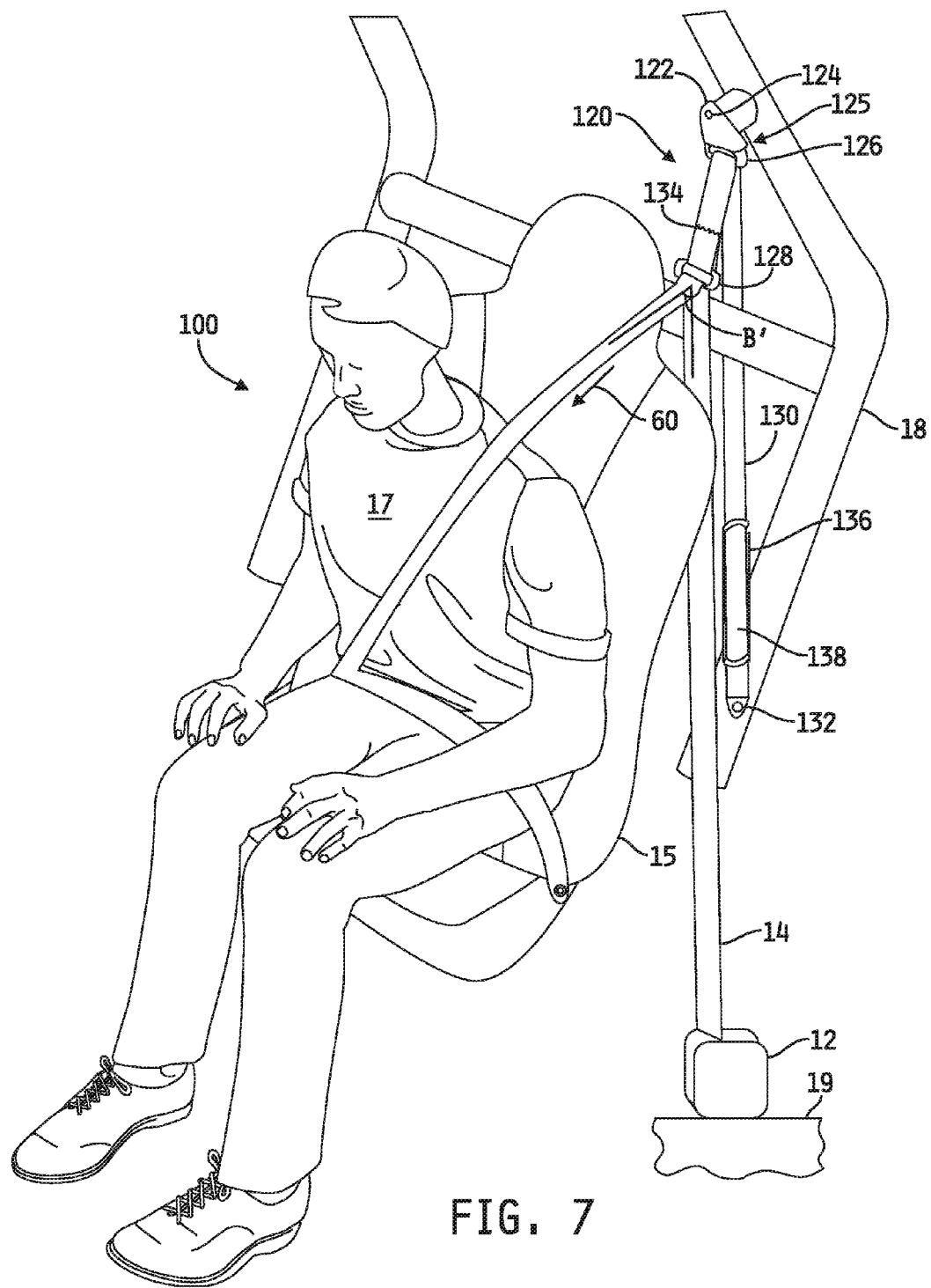
FIG. 7 is a simplified diagram of the apparatus of FIG. 6 shown in the same perspective view with the apparatus under dynamic loading conditions.

The elastically deformable web section 138, and thus the elastically deformable web 130, provides some amount of dynamic relief in the tension of the web 130 under conditions in which the occupant 17 applies a forward force, i.e., generally in the direction of the directional arrow 60 (and of the x-axis of the coordinate system superimposed onto FIG. 4), to the web 14, by elastically increasing in overall length as tension is applied by the web 14 to the web coupling member 128 as the occupant 17 moves forward. Peak loads applied by the occupant 17 through the web 14 to the apparatus 120 under such conditions are thus attenuated. Such elastic deformation of the web 130, and of the resulting attenuation of peak loads by the apparatus 120, is illustrated in FIGS. 4-5 for an occupant 17 of smaller size/stature and also in FIGS. 6-7 for an occupant 17 of larger size/stature. FIG. 4, for example, shows the smaller-sized occupant in an at-rest position (i.e., no load dynamic load applied by the occupant to the apparatus 120). In this position, the overall length of the web 130 is defined by the sum of the length of the web 130 on each side of the elastically deformable web section 138 and the no-load (i.e., no tensile load) length of the elastically deformable web section 138. FIG. 5, on the other hand, represents a dynamic load condition in which the occupant 17 has moved forward (i.e., in the direction 60) relative to the vehicle seat 15 and in which the length of the web 14 is locked, i.e., either via secure attachment of the terminal ends of the web 14 between the vehicle seat 15 and the mount 12 in embodiments in which the mount 12 is a stationary structure (relative to the vehicle in which the restraint system 100 is mounted) or by locking of the web retractor 12 in embodiments in which the mount 12 is a web retractor. Under such dynamic load conditions, the tensile load applied by the web 14 to the web coupling member 128 causes the elastically deformable section 138 to stretch, thereby increasing the length of the web 130 between the web guide 126 and the web coupling member 128 and attenuating the load applied to the webs 14, 130 by the occupant 17. As further illustrated in FIG. 5, the maximum overall length of the web 130 is determined by the length of the web section 136 such that the maximum overall length of the web 130, and thus the maximum attenuation of load applied to the apparatus 120, is the sum of the lengths of the web section 136 and of the web 130 on either side of the elastically deformable section 138. Illustratively, the lengths of the web sections 136 and 138 are selected such that the maximum tensile load that may be applied to the elastically deformable web section 138 before the length of the elastically deformable web section 138 increases to the length of the web section 136 is less than the maximum or ultimate tensile strength of the material from which the deformable web section 138 is constructed. In any case, FIGS. 6 and 7 illustrate the same peak load attenuation feature of the apparatus 120 for a larger-sized occupant.

Referring again to FIGS. 4 and 5, the combination of the web guide 126 and the web coupling member 128 further provide an adjustable web positioning feature that automatically sets the top or upper position of the web 14, i.e., the area of the web 14 that engages the web coupling member 128, during static and dynamic load conditions based on the size of the occupant 17 seated in the occupant seat 15 such that the web 14 rides on the shoulder of the occupant and not against the neck or head of the occupant 17. For example, because the web coupling member 128 is coupled to the web guide 126 only by the flexible web 130, and because the web guide 126 and the web coupling member 128 are both freely pivotable in fore and aft directions as described above, the angle between the sections of web 14 on either side of the web coupling member 128 is automatically set by the pivotable web guide 126 and web coupling member 128 based on the height and girth of the occupant 17. Thus, the angle "A" between the sections of web 14 on either side of the web coupling member 128 set by the web guide 126 and the web coupling member 128 for the smaller-sized occupant 17 as shown in FIG. 4 is less than the angle "B" between the sections of web 14 on either side of the web coupling member 128 set by the web guide 126 and the web coupling member 128 for the larger-sized occupant 17 as shown in FIG. 6. Moreover, because the length of the web 130 between the end 132 and the web coupling member 128 may vary under the web loading conditions just described above, the position of the web coupling member 128 relative to the web guide 126 is likewise variable under such web loading conditions in vertical height, e.g., along the z-axis of the coordinate system superimposed onto FIG. 4, and/or in fore and aft directions relative to the vehicle, e.g., along the x-axis of the coordinate system superimposed onto FIG. 4. As the occupant 17 moves forward in the vehicle seat 15 under the dynamic loading conditions described above and the space between the web guide 126 and the web coupling member 128 attendantly increases as the overall length of the web 130 increases in response to the dynamic loading conditions, the angle between the sections of web 14 on either side of the web coupling member 128 automatically self-adjusts by the pivoting of the web guide 126 and/or of the web coupling member 128, and/or by the automatic repositioning of the web coupling member 128 relative to the web guide 126 (vertically and/or fore/aft), to maintain the position of the web 14 on the shoulder of the occupant 17. Thus, as illustrated in FIG. 5, the angle A between the sections of web 14 on either side of the web coupling member 12 is automatically adjusted by the apparatus 120 to a different angle A' that maintains the web 14 engaged with the shoulder of the smaller-sized occupant 17, and as illustrated in FIG. 7, the angle B between the sections of web 14 on either side of the web coupling member 12 is automatically adjusted by the apparatus 120 to a different angle B' that maintains the web 14 engaged with the shoulder of the larger-sized occupant 17. As the occupant 17 returns to the at-rest positions illustrated in FIGS. 4 and 6 following the dynamic loading event, the apparatus 120 again self-adjusts to return the angle between the sections of web 14 on either side of the web coupling member 128 to A and B respectively as shown.

Referring now to FIGS. 8-13, a simplified diagram is shown of yet another occupant restraint system 200 for a movable vehicle which includes another embodiment of a web position adjustment and attenuation apparatus 220. In the embodiment illustrated in FIGS. 8-13, the mount 12, web 14, vehicle seat 215 (labeled 15 in FIGS. 1-3), frame 18, floor 19 and the vehicle in which the restraint system 100 is mounted are all as described above with respect to FIGS. 1-3, although the mount 12 and floor 19 are not shown in FIGS. 8-13 and the web 14 is shown by dashed-line representation for clarity of illustration of the various components of the apparatus 220. Many of the structural features of the system 200 and of the apparatus 220 are as described with respect to FIGS. 1-3, and operation of the restraint system 200 and of the apparatus 220 is generally as described with respect to FIGS. 1-3. The description of the structure and operation of the system 10 and apparatus 20 is thus generally applicable to the system 200 and apparatus 220 of FIGS. 8-13.

In the embodiment illustrated in FIGS. 8-13, the web position adjustment and attenuation apparatus 220 includes a web guiding bracket 234 and a web coupling member 250 each configured to receive the flexible web 14 therethrough. As illustrated in FIGS. 1-3, and described hereinabove with respect to the web position adjustment and attenuation apparatus 20, the web position adjustment and attenuation apparatus 220 illustratively provides for adjustment in the position of the web 14 relative to a shoulder, neck and/or head of an occupant 17 of the vehicle seat 215 and further provides for the attenuation of peak loads applied to the web 14 by the occupant 17 under various operating conditions of the vehicle in which the occupant restraint system 200 is mounted.

The web position adjustment and attenuation apparatus 220 illustratively includes an elongated body 230 extending between and attached or mounted to opposing brackets 232 and 234 at opposite, terminal ends 230A, 230B thereof. The elongated body 230 is illustratively provided in the form of a strip having a planar front surface 235A and a planar back surface 235B, and having a length defined between the top end 230A and the bottom end 230B thereof that is greater than a width defined between opposing sides thereof. The planar front surface 235 is illustratively forward oriented or forward facing, e.g., such that the front surface 235 faces in the direction of forward motion of the vehicle, e.g., in a direction generally perpendicularly away from the front surface of the vehicle seat 15, 215 which supports the upper torso of the occupant 17. It will be understood that such a configuration of the elongated body 320 is shown and described only by way of example, and that this disclosure contemplates other shapes and configurations of the elongated body 230.

In one embodiment, elastic deformation of the elongated body 230 is achieved via choice of material from which the elongated body 230 is fabricated. In some such embodiments, the elongated body 230 may be constructed partially or entirely of one or more elastomers, such as rubber, although one or more other elastomers and/or one or more other elastically deformable materials may alternatively be used. In other embodiments, the elongated body 230 may be constructed of a rigid or semi-rigid backbone to which an elastically deformable structure or material is attached, affixed or integrally formed.

The brackets 232 and 234 are each configured to be attached or affixed to the vehicle, e.g., to the frame 18 of the vehicle via one or more suitable fixation members, e.g., screws, nut/bolt combinations or the like. In the illustrated embodiment, for example, the bracket 232 is shown affixed to a frame member 18' that is affixed to or integral with the frame 18. The bracket 234 is shown affixed to the frame 18 via a single, conventional fixation member 280, e.g., a single screw or bolt, extending through a spacing member 282 between the bracket 234 and the frame 18 and into engagement with the frame 18 and/or into engagement with a complementarily configured fixation member to secure the bracket 234 to the frame 18. The bracket 234 is positioned generally behind the vehicle seat 215, and is illustratively positioned at a height, relative to the vehicle seat 215, at which the web coupling member 250, at least in its vertically highest position, will be above the shoulder of a relatively tall occupant of the vehicle seat 215. The elongated body 230 is illustratively oriented vertically within the vehicle such that the bracket 234 is positioned above, and aligned with, the bracket 232, although other orientations of the elongated 230 are contemplated by this disclosure. Moreover, although both brackets 232 and 234 are illustrated in FIGS. 8-13 as being attached or otherwise mounted to the frame 18, 18' of the vehicle, this disclosure contemplates embodiments in which only one or the other of the brackets 232, 234 is mounted to the frame 18, 18' with the remaining bracket unconnected to the vehicle and/or omitted altogether. Alternatively still, this disclosure contemplates embodiments in which the bracket 232 is mounted or affixed to another structure within the vehicle, such as the vehicle floor 19, side wall, the vehicle seat 215 or other support structure within the vehicle.

In the embodiment illustrated in FIGS. 8-13, the top or upper bracket 234 includes a web guide integral therewith, e.g., in the form of a web slot 236 defined through the bracket 234. Illustratively, the web slot 236 is an elongated, e.g., linear, slot having a longitudinal axis oriented generally parallel to the direction of the width of the elongated body 230. In the embodiment illustrated in FIGS. 8-13, the web 14 illustratively passes from the mount 12 upwardly toward and along a rear portion of the top bracket 234, through the web slot 236 and then downwardly along a front portion of the top bracket 234 and at least a portion of the front surface of the elongated body 230 as illustrated by dashed-line representation in FIG. 8.

Figure 11:
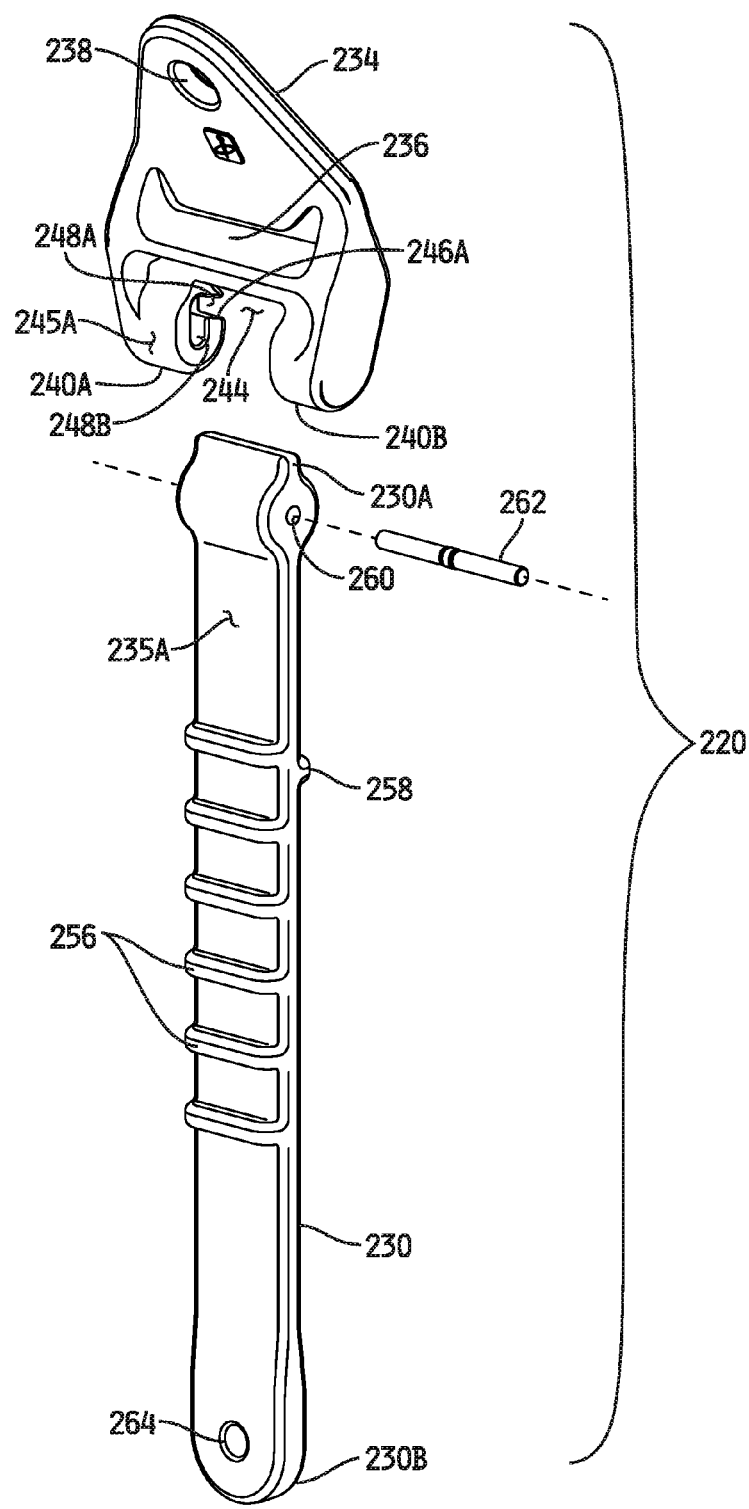
FIG. 11 is a front perspective assembly view of some of the components of the apparatus of FIGS. 8-10.
Figure 12:
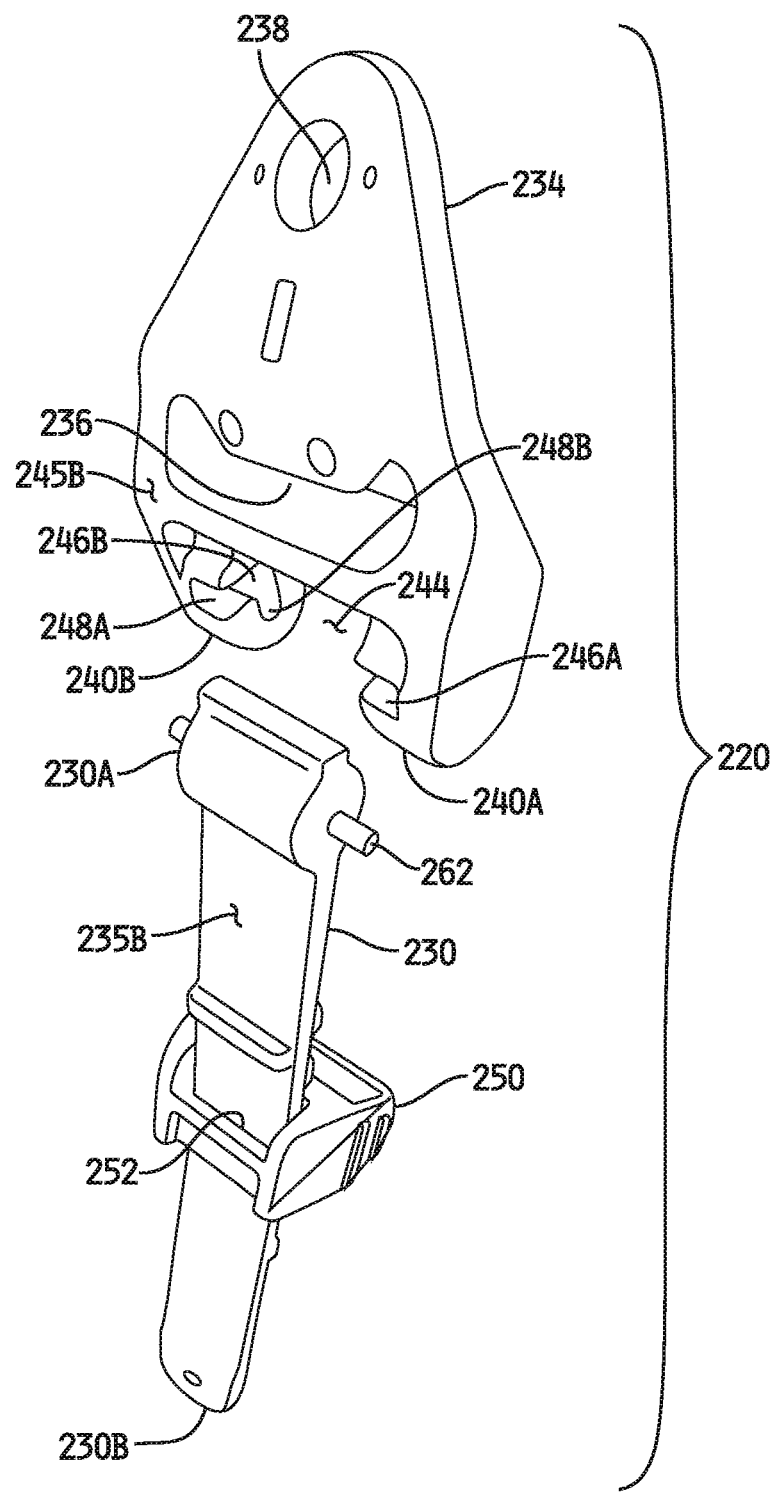
FIG. 12 is a rear perspective assembly view of some of the components of the apparatus of FIGS. 8-11.

As most clearly illustrated in FIGS. 11 and 12, the elongated body 230 defines therethrough a passageway or bore 260 at or near the top end 230A thereof which extends through the elongated body 230 in a transverse direction, i.e., generally parallel with a width of the elongated body 230 along a plane defined by the front surface 235 of the elongated body 230. The passageway 260 is illustratively sized to receive therethrough a pin or rod 262, and the pin or rod 262 is illustratively sized such that opposing ends thereof extend beyond the elongated body 230 on either side thereof when the pin or rod 262 is received within and through the passageway 260, as illustrated in FIG. 12. The bracket 234 includes a pair of opposing lobes 240A and 240B that extend downwardly therefrom, e.g., at a bottom end of the bracket 234 opposite to a top end of the bracket 234 at or near which an opening 238 is defined and sized to receive therethrough the bracket mounting fixation member 280. An opening or passageway 244 is defined between the opposing lobes 240A, 240B, and on the back side of the bracket 234 each lobe 240A, 240B defines therein a slot or channel 246A, 246B respectively. The channels 246A, 246B are axially aligned with each other, and each channel 246A, 246BB illustratively extends transversely across the respective lobe 246A, 246B with a longitudinal axis thereof generally parallel with the longitudinal axis of the web slot 236.

Each such channel 246A, 246B illustratively includes a horizontal channel portion 248A which extends into the rear surface 245B of the bracket 234 at the respective lobe 240A, 240B in a direction toward the front surface 245A of the bracket 234 such that the horizontal channel portion 246A along its length is generally normal to the longitudinal axis of the web slot 236. Each such channel 246A, 246B further illustratively includes a vertical channel portion 248B which extends from the end of the horizontal portion 248A downwardly in a direction toward the bottom end of the respective lobe 240A, 240B such that the vertical channel portion 248B along its length is generally normal to the direction defining the length of the horizontal channel portion 248A.

The elongated body 230 is mounted to the bracket 234 by first passing the pin or rod 262 into and through the passageway 260 such that end portions of the pin or rod 262 extend from the passageway 260 on each side of the elongated member 230 as illustrated in FIG. 12, and then passing the opposing ends of the pin or rod 262 into respective ones of the axially aligned channels 246A, 246B; first into the axially aligned horizontal portions 248A of the channels 246A, 246B, and then downwardly into the vertical portions 248B of the channels 246A, 246B. With the elongated body 230 thus mounted to the bracket 234, the elongated bracket 230 is pivotally movable relative to the bracket 234, i.e., relative to the ends of the vertical portions 248B of the channels 246A, 246B about the longitudinal axis of the pin or rod 262.

Figure 8:
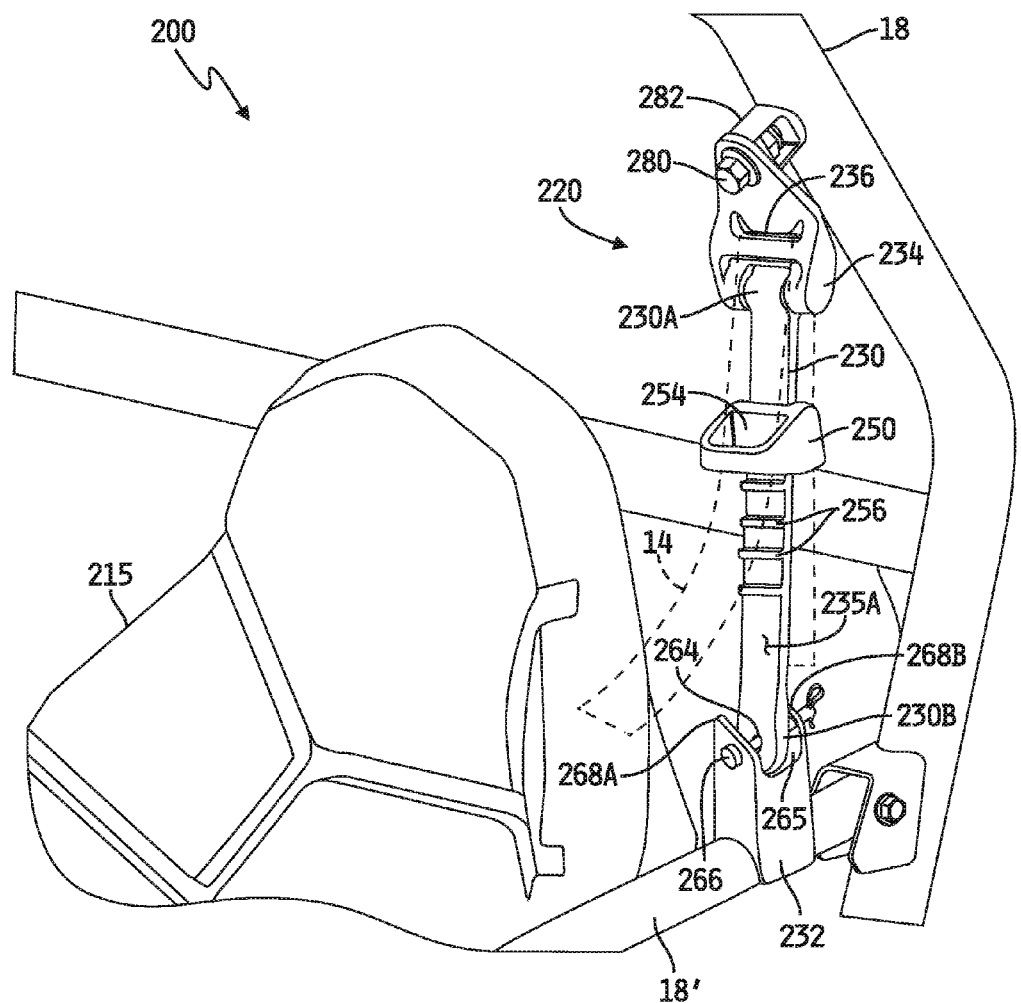
FIG. 8 is a simplified diagram of yet another embodiment of a web position adjustment and attenuation apparatus for an occupant restraint system shown in a perspective view relative to a vehicle in which the apparatus is mounted with the apparatus adjusted to accommodate a relatively tall vehicle seat occupant.

The elongated body 230 also defines therethrough another opening 264 at or near the bottom end 230B thereof which extends through the elongated body 230 in a direction generally normal to the direction of the opening 260. As illustrated in FIG. 8, the bottom or lower bracket 232 affixed to the frame member 18' includes a pair of upstanding sidewalls 268A, 268B defining a space 265 therebetween into which the end 230B of the elongated body 230 extends. A pin or rod 266 extends through aligned openings defined through each of the upstanding sidewalls 268A, 268B and also through the opening 264 defined through the elongated body 230 to secure the elongated body 230 to the bracket 232 at or near the bottom end 230B thereof.

The apparatus 220 further includes a web coupling member 250 defining a slot 252 therethrough (see, e.g., FIGS. 10 and 12) sized and configured to slidingly receive the elongated body 230 therethrough such that the web coupling member 250 is movable along the elongated body 230, e.g., generally along at least a portion thereof between the opposite ends 230A, 230B thereof. Illustratively, the slot 252 is an elongated, e.g., linear, slot defining a longitudinal axis that is generally parallel with the longitudinal axis of the web slot 236 of the upper bracket 234 when the elongated body 230 is mounted to the upper bracket 234 and the web coupling member 250 is slidingly received on the elongated body 230.

In some embodiments, the length of the slot 252 is sized to be slightly longer than the width of the elongated body 230 such that the web coupling member 250 is freely movable along the elongated body 230 relative to the sides or edges thereof. In other embodiments, the length of the slot 252 may be sized to be substantially the same as the width of the elongated body 230 such that ends of the slot 252 engage the sides or edges of the elongated body 230 as the web coupling member moves along the elongated body 230. In still other embodiments, e.g., in embodiments in which the elongated body 230 and/or the web coupling member 250 is/are made of or include(s) a resilient, elastically deformable material, the length of the slot 252 may be sized to be slightly less than the width of the elongated body 230 such that the ends of the slot 252 and/or the sides or edges of the elongated body 230 elastically deform(s) as the web coupling member 250 is received on and moves along the elongated member 230.

In some embodiments, the width of the slot 252 is sized to be slightly longer than the thickness of the elongated body 230, i.e., between the front surface 235A and the rear surface 235B thereof, such that the web coupling member 250 is freely movable along the elongated body 230 relative to the front and rear surfaces 235A, 235B thereof. In other embodiments, the width of the slot 252 may be sized to be substantially the same as the thickness of the elongated body 230 such that the sides of the slot 252 between its opposing ends engage the front and rear surfaces 235A, 235B of the elongated body 230 as the web coupling member moves along the elongated body 230. In still other embodiments, e.g., in embodiments in which the elongated body 230 and/or the web coupling member 250 is/are made of or include(s) a resilient, elastically deformable material, the width of the slot 252 may be sized to be slightly less than the thickness of the elongated body 230 such that the sides of the slot 252 between its opposing ends and/or the front and rear surfaces 235A, 235B of the elongated body 230 elastically deform(s) as the web coupling member 250 is received on and moves along the elongated member 230.

The web coupling member 250 further defines a web slot 254 therethrough which, when the web coupling member 250 is slidingly received on the elongated body 230, is positioned in front of and adjacent to the front surface 235 of the elongated body 230. Illustratively, the web slot 254 is an elongated, e.g., linear, slot defining a longitudinal axis that is generally parallel with the longitudinal axis of the slot 252 and also with the longitudinal axis of the web slot 236 of the upper bracket 234 when the elongated body 230 is mounted to the upper bracket 234 and the web coupling member 250 is slidingly received on the elongated body 230. The web slot 254 is illustratively sized to receive and allow passage therethrough of the flexible web 14, and the web 14 extending forwardly through the web slot 236 of the upper bracket 234 illustratively passes downwardly along the front surface 235 of the elongated body 230 and through the web slot 254 defined through the web coupling member 250, and then extends forwardly in the vehicle toward the vehicle seat 215 and occupant 17 as shown by dashed-line representation in FIG. 8.

In some embodiments, such as that illustrated in FIGS. 8-13, the elongated body 230 includes a plurality of space-apart protrusions 256 attached to or integral with the front surface 235, wherein such protrusions 256 illustratively extend longitudinally along at least a portion of the elongated body 230. In such embodiments, the web coupling member 250 is illustratively engageable with each such protrusion 256 and/or engageable between adjacent ones of such protrusions 256, to set and secure the web coupling member 250 in a selected one of a plurality of different discrete positions of the web coupling member 250 relative to the elongated body 230. In other embodiments, such as that illustrated in FIG. 1) the elongated body 230 may not include any such protrusions, and instead the elongated body 230 and the web coupling member 250 may be sized and/or configured (e.g., via material choice) to engage and/or releasably engage each other such that the web coupling member 250 is positionable at any of various locations along the elongated body 230 and will remain at any such selected position without the use of additional engagement or restraint structure(s).

In embodiments which include such protrusions 256, the protrusions 256 are each illustratively sized to abut the web coupling member 250 adjacent to at least a portion of the slot 252 defined therethrough such that the web coupling member 250 is discretely positionable along the elongated body 230 between adjacent ones of the longitudinally spaced protrusions 256. In some embodiments, at least one of the web coupling member 252 and each protrusion 256 is elastically deformable to allow forced passage by each protrusion 256 of the web coupling member 250 as the web coupling member 250 is longitudinally moved along the elongated body 230 to one of a plurality of discrete web coupling member positions defined between and/or against different adjacent ones of the plurality of protrusions 256. In the illustrated embodiment, the protrusions 256 are provided in the form of ribs each extending upwardly from the front surface 235 of the elongated body 230 in a direction normal to a plane defined by the front surface 235 and extending across the width of the front surface 235 to the sides or edges of the elongated body 230. Those skilled in the art will recognize alternate shapes and/or alternate positioning of such protrusions, and it will be understood that any such alternate shapes and/or positioning of one or more such protrusions relative to the elongated body 230 are contemplated by this disclosure.

In some alternate embodiments of the elongated body 230 illustrated in FIGS. 8-13 and/or of the elongated body 30 illustrated in FIGS. 1-3, one or more detents, e.g., in the form of one or more slots, channels, bores or the like, may be formed in either or both of the surfaces 235A, 235B of the elongated body 230 in place of one or more of the protrusions 256 (or in either or both of the front 35 and rear surfaces of the elongated body 30 in place of one or more of the protrusions 56), and one or more complementarily configured protrusions may be formed within or adjacent to the slot 252 in or on the web coupling member 250 (or within or adjacent to the slot 52 in or on the web coupling member 50). In such embodiments, the one or more protrusions formed within or adjacent to the slot 52, 252 in or on the web coupling member 50, 250 is/are configured to engage the one or more detents formed on, and in some embodiments along the length of, the elongated body 30, 230 as the web coupling member 50, 250 is longitudinally moved along the elongated body 30, 230 to one or more discrete web coupling member positions defined by each of the one or more detents.

Figure 9:
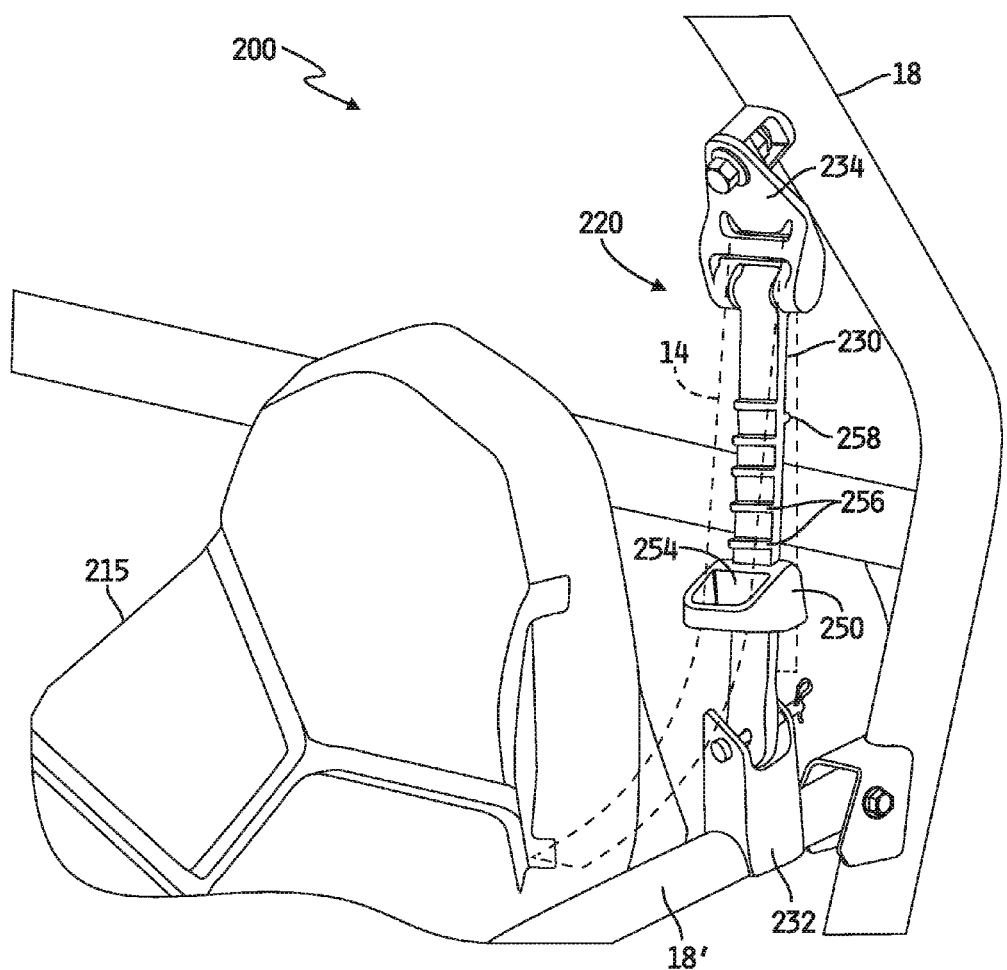
FIG. 9 is a simplified diagram of the apparatus of FIG. 8 shown in the same perspective view with the apparatus adjusted to accommodate a relatively short vehicle seat occupant.
Figure 10:
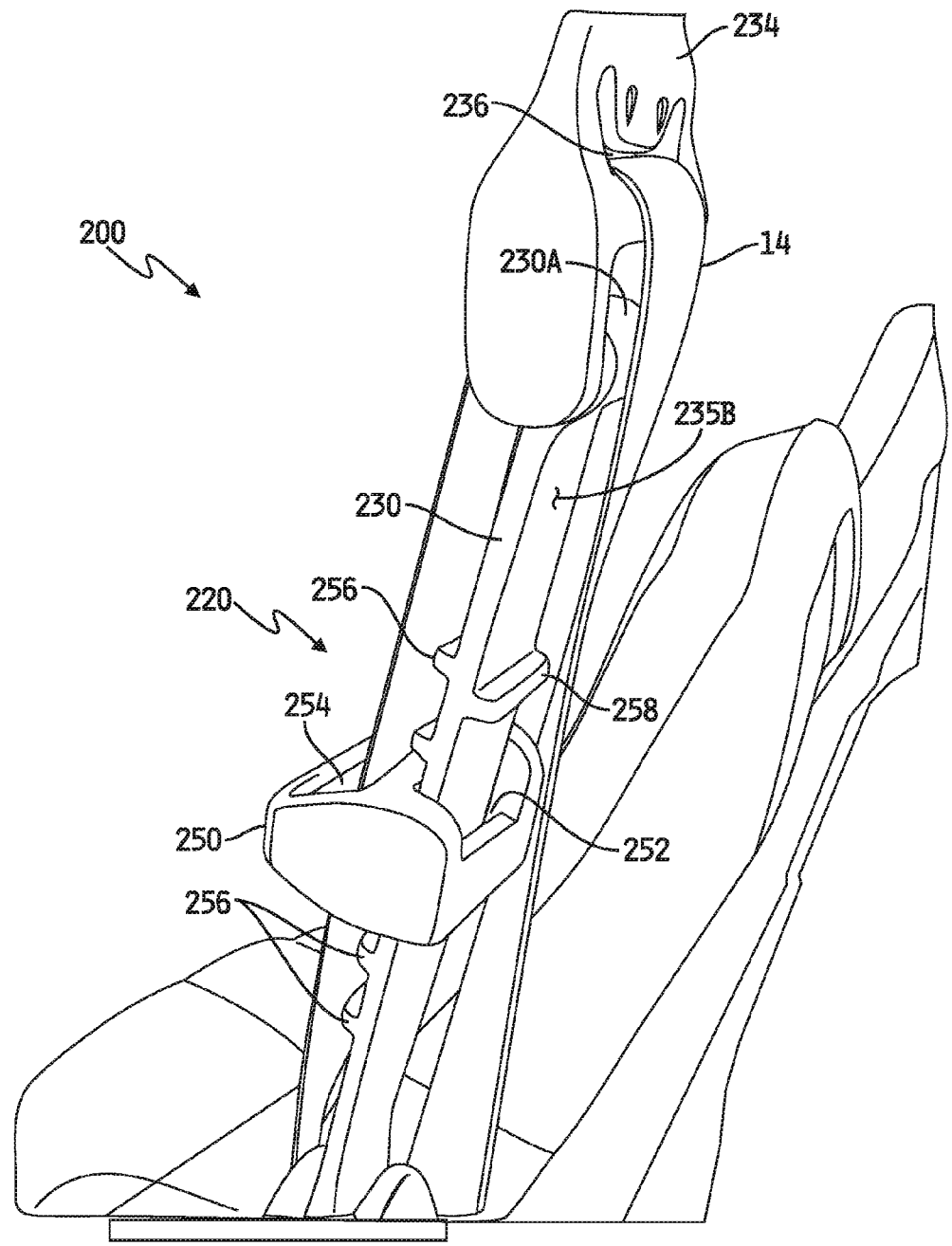
FIG. 10 is a simplified diagram of the apparatus of FIGS. 8 and 9 shown in a rear perspective view thereof.
Figure 13:
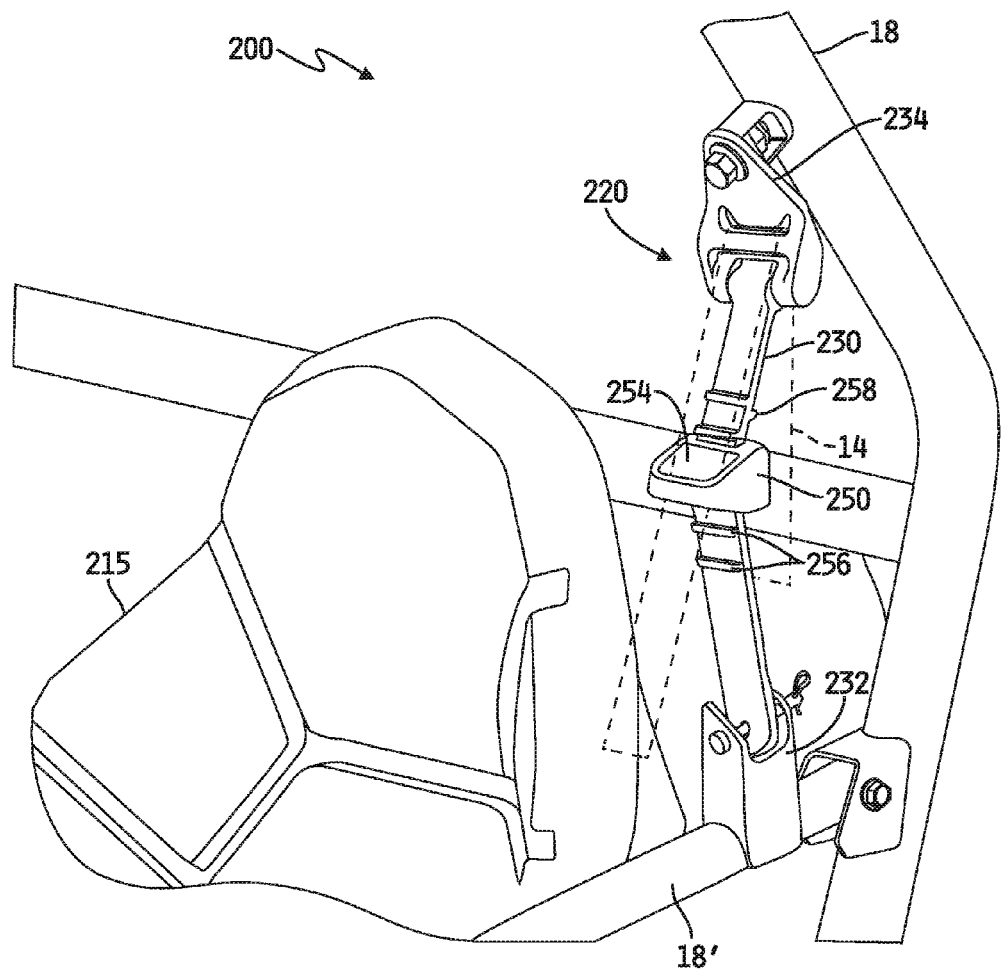
FIG. 13 is a simplified diagram of the apparatus of FIGS. 8-12 shown in the same perspective view as FIGS. 8 and 9 with the apparatus under dynamic loading conditions.

In some embodiments, as illustrated in FIGS. 9-10 and 13, the rear surface 235B of the elongated body 230 may include at least one additional protrusion 258 extending therefrom. Such a protrusion 258, in embodiments which include such a protrusion, may be included to limit the upward movement of the web coupling member 250 relative to the elongated body 230.

As described hereinabove with respect to the restraint system 10 and the web position adjustment and attenuation apparatus 20 illustrated in FIGS. 1-3, the position of the web coupling member 250 is illustratively positionable along and relative to the elongated body 230 of the web position adjustment and attenuation apparatus 220 in order to establish a top position of the web relative to the vehicle seat 215 and/or occupant 17. In FIG. 8, for example, the web coupling member 250 is positioned at a top position thereof relative to the elongated body 230. In some embodiments, such a top position of the web coupling member 250 may be established by inclusion of one or more protrusions extending from either or both of the front and rear surfaces 235A, 235B of the elongated body 230, and in the embodiment illustrated in FIGS. 8-13 the top position of the web coupling member 250 is illustratively established by a combination of the top-most protrusion 256 extending from the front surface 235 and the protrusion 258 extending from the rear surface 235B, as illustrated in FIG. 10. In other embodiments, no such mechanism(s) may be provided to limit upward movement of the web coupling member 250 relative to the elongated body 230.

In FIG. 9, in contrast, the web coupling member 250 is positioned at a bottom position thereof relative to the elongated body 230. In some embodiments, such a bottom position of the web coupling member 250 may be established by inclusion of one or more protrusions extending from either or both of the front and rear surfaces 235A, 235B of the elongated body 230, although in other embodiments, such as that illustrated in FIGS. 8-13, no such mechanism may be provided to limit downward movement of the web coupling member 250 relative to the elongated body 230.

In FIG. 13, in further contrast, the web coupling member 250 is positioned near the middle of the elongated body 230. Such adjustable positioning of the web coupling member 250 relative to the elongated body 230, and thus the adjustable positioning of the top position of the web 14 relative to the vehicle seat 215, thus allows appropriate positioning of the web 14 relative the shoulders of different sized occupants 17 of the vehicle seat 215 while also providing the ancillary benefit of avoiding contact between the web 14 and the neck and/or head of the occupant 17.

As described in detail hereinabove with respect to FIGS. 1-7, and as further illustrated in FIG. 13, the elongated body 230 is elastically deformable so as to provide some amount of attenuation in the forward movement of the web 14 and occupant 17 under dynamic loading conditions of the type described above. Illustratively, the elongated body 230 is generally elastically deformable in non-parallel directions relative to the length or longitudinal direction of the elongated body 230 such that the elongated body 230 will dissipate, i.e., absorb, energy resulting from forces applied by the occupant to the web 14 by elastically deforming, e.g., by flexing outwardly (generally forwardly), under dynamic loading conditions applied by the web 14 to the web coupling member 250 regardless of the location of the web coupling member 250 relative to the elongated body 30. In embodiments in which the elongated body 230 is provided in the form of a strip with a planar front surface 235 as illustrated by example in FIGS. 8-13, the elongated body 230 is generally elastically deformable in directions normal to the planar front surface 235 and less so, if at all, in directions parallel to the planar front surface 235 and in directions parallel to the length of the elongated body 230. In embodiments in which the top 230A of the elongated body 230 is pivotally mounted to the upper bracket 234, such as illustrated and described with respect to FIGS. 11 and 12, pivotal movement of the elongated body 230 relative to the upper bracket 234 illustratively facilitates such elastic deformation of the elongated body 230 as such rotation of the top 230A of the elongated body 230 under dynamic loading conditions redirects forces applied by the web 14 in non-horizontal directions (e.g., forwardly and downwardly) relative to the elongated body 230 perpendicularly away from the planar front surface 235A of the elongated body 230 as illustrated by example in FIG. 13. In any case, the elastically deformable elongated body 230 provides some amount of dynamic relief in the tension of the web 14, under conditions in which the occupant 17 applies a forward force, i.e., generally in the direction of the directional arrow 60 illustrated in FIG. 1, to the web 14, by elastically deforming generally in the forward direction to thereby effectively extend the length of the web 14 relative to the stationary brackets 232, 234 while also dampening the forward force and thus attenuating peak loads applied by the occupant 17 through the web 14 to the apparatus 220.

In one embodiment, elastic deformation of the elongated body 230 is achieved via choice of material from which the elongated body 230 is fabricated. In such embodiments, the elongated body 230 may be constructed partially or entirely of one or more elastomers, such as rubber, although one or more other elastomers and/or one or more other elastically deformable materials may alternatively be used. In other embodiments, the elongated body 230 may be constructed of a rigid or semi-rigid backbone to which an elastically deformable structure or material is attached, affixed or integrally formed.

Figure 14:
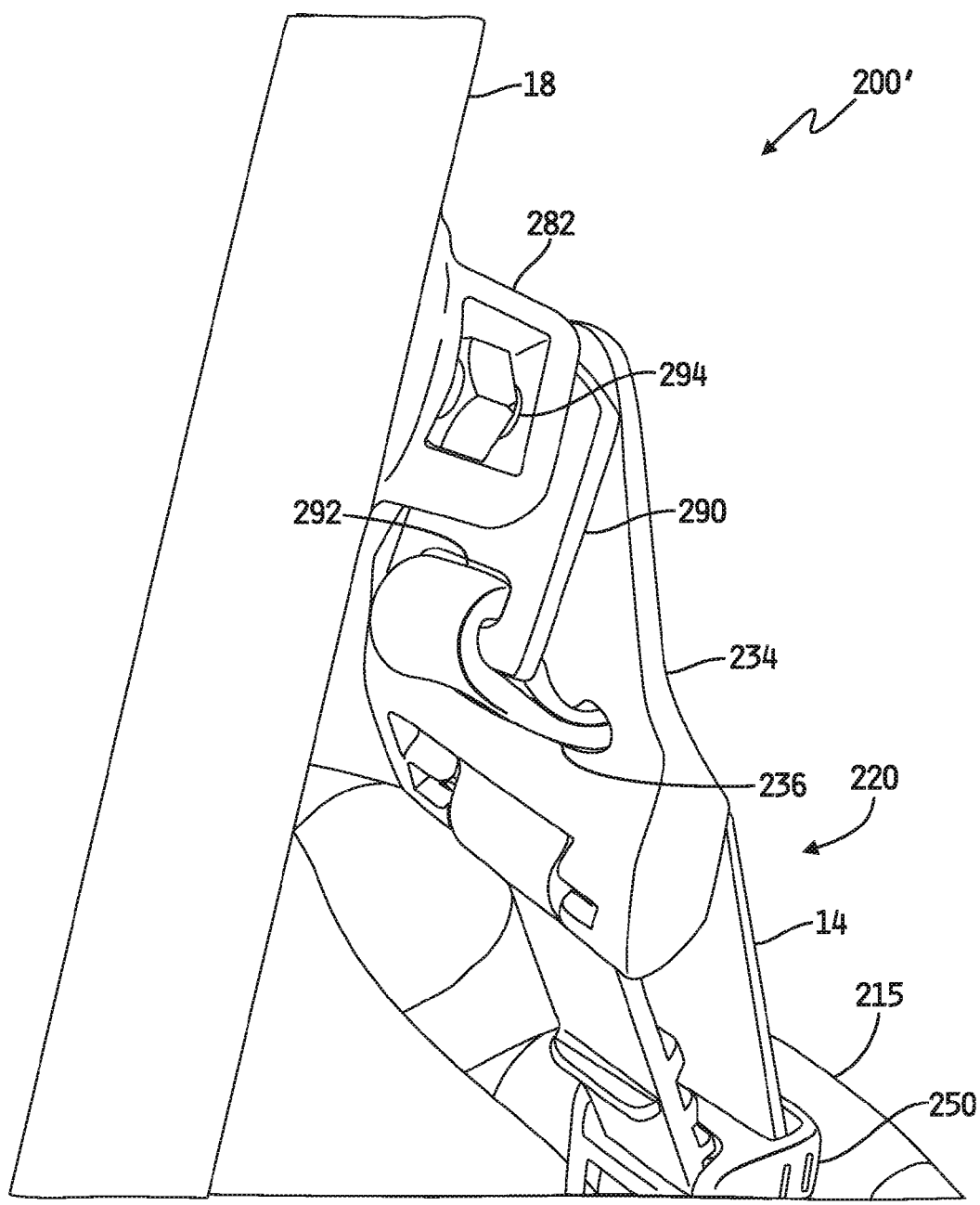
FIG. 14 is a rear perspective view of the apparatus of FIGS. 8-13 shown with an alternate web attachment configuration.

Referring now to FIG. 14, a rear perspective view is shown of the web position and attenuation apparatus 220' implemented in an alternate occupant restraint system 200'. In the alternate occupant restraint system 200' illustrated in FIG. 14, the end of the flexible web 14 extending rearwardly from the upper bracket 234, which is attached to the mount 12 in the embodiment illustrated in FIGS. 8-13, is secured to the frame 18 of the vehicle carrying the system 200'. In the embodiment illustrated in FIG. 14, the end of the web 14 extending rearwardly from the slot 236 of the upper bracket 234 is secured to a mounting plate 290 which is, in turn, secured to the frame 18 of the vehicle between the upper bracket 234 and the mounting spacer 282. The mounting plate 290 illustrative defines a web slot 292 sized to receive the web 14 therethrough, and the end of the web 14 extending rearwardly from the slot 236 of the upper bracket 234 is passed through the web slot 292 and then secured to itself in a conventional manner, e.g., via one or more of stitching, adhesive, heat bonding or the like. The mounting plate 290 also defines an opening 294 sized to receive the fixation member 282 therethrough such that engagement of the fixation member 282 with the mounting spacer 282 and/or the frame 18 of the vehicle traps the mounting plate 290 between the upper bracket 234 and the mounting spacer 282 and thereby secures the mounting plate 290, and thus the end of the web 14, to the upper bracket 234, mounting spacer 282 and vehicle frame 18. In some such embodiments, the web 14 may be attached to a retractor located along or at an opposite end of the web 14, and in other embodiments the occupant restraint system 200' may include one or more conventional web length adjustment devices for manually adjusting a length of the web 14.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A web position and attenuation apparatus, comprising:
   an elastically deformable body having a first end and a second end opposite the first end, one of the first and second ends configured to be affixed to a frame of a movable vehicle,
   a web coupling member received on the elastically deformable body, the web coupling member movable relative to, and positionable along, the elastically deformable body, the web coupling member defining a web slot, and
   a flexible web extending through the web slot, the flexible web part of a restraint system to restrain an occupant of a vehicle seat mounted within the vehicle,
   the elastically deformable body responsive to dynamic loads applied by the occupant through the flexible web to the web coupling member to absorb energy and attenuate tension in the flexible web via elastic deformation of the elastically deformable body.

2. The web position and attenuation apparatus of claim 1, further comprising a first bracket mounted to the one of the first and second ends of the elastically deformable body, the first bracket affixable to the frame of the movable vehicle.

3. The web position and attenuation apparatus of claim 2, further comprising a second bracket mounted to the other of the first and second ends of the elastically deformable body, the second bracket affixable to the frame of the movable vehicle.

4. The web position and attenuation apparatus of claim 1, wherein the elastically deformable body comprises an elongated body defining a plane between the first and second ends thereof,
   and wherein the elongated planar body is elastically deformable in non-parallel directions relative to the plane defined by thereby.

5. The web position and attenuation apparatus of claim 1, wherein the elastically deformable body defines opposite sides each extending between the first and second ends of the elastically deformable body, and a transverse direction of the elastically deformable body surface extends between the opposite sides thereof,
   and wherein the web slot comprises an elongated slot extending in a direction parallel to the transverse direction.

6. The web position and attenuation apparatus of claim 1, wherein the flexible web is affixed to the frame of the movable vehicle.

7. The web position and attenuation apparatus of claim 1, further comprising a web retractor mounted within the movable vehicle,
   wherein one end of the flexible web is coupled to the web retractor such that the flexible web is retractable within and extendable from the web retractor.

8. A web position and attenuation apparatus, comprising:
   an elastically deformable body having a first end and a second end opposite the first end, one of the first and second ends configured to be affixed to a frame of a movable vehicle,
   a web coupling member received on the elastically deformable body, the web coupling member movable relative to, and positionable along, the elastically deformable body, the web coupling member defining a web slot, and
   a flexible web extending through the web slot, the flexible web part of a restraint system to restrain an occupant of a vehicle seat mounted within the vehicle,
   the elastically deformable body elastically deforming under dynamic forces applied by the flexible web to the web coupling member in directions forwardly away from a seat back of the vehicle seat to attenuate peak loads in the flexible web.

9. The web position and attenuation apparatus of claim 8, further comprising a plurality of protrusions extending from the elastically deformable body and longitudinally spaced apart from each other between the first and second ends of the elastically deformable body,
   wherein the web coupling member defines an opening sized to receive the elastically deformable body therethrough, the opening movable along the elastically deformable body to discretely position the opening between adjacent ones of the plurality of spaced-apart protrusions.

10. The web position and attenuation apparatus of claim 9 wherein the each of the plurality of protrusions is sized to abut the web coupling member adjacent to at least a portion of the opening defined therethrough,
    and wherein at least one of the web coupling member and each of the plurality of protrusions is elastically deformable to allow forced passage thereby of the web coupling member as the web coupling member is moved along the elastically deformable body to one of a plurality of discrete positions each defined between different adjacent ones of the plurality of protrusions.

11. The web position and attenuation apparatus of claim 10, wherein the elastically deformable body comprises an elongated planar strip defining a first planar surface between the first and second ends thereof and a second planar surface opposite the first planar surface, each of the first and second planar surfaces having a length defined between the first and second ends of the elongated planar strip and a width defined between opposite sides of the elongated planar strip,
    and wherein the web slot comprises a first linear slot adjacent to the first or the second planar surface of the elongated body and extending transversely across the width of the first or the second planar surface.

12. The web position and attenuation apparatus of claim 11 wherein at least one of the plurality of protrusions comprises a rib normal to a plane defined by the first planar surface and extending across the width of the first planar surface.

13. The web position and attenuation apparatus of claim 11 further comprising at least one protrusion extending from the second planar surface of the elongated planar strip.

14. The web position and attenuation apparatus of claim 11 wherein the opening defined through the web coupling member comprises a second linear slot parallel with the first linear slot.

15. A web position and attenuation apparatus, comprising:
an elongated body having a first end and a second end opposite the first end, one of the first and second ends configured to be affixed to a frame of a movable vehicle,
a web coupling member received on the elongated body, the web coupling member movable relative to, and positionable along, the elongated body, the web coupling member defining a web slot, and
a flexible web extending through the web slot, the flexible web part of a restraint system to restrain an occupant of a vehicle seat mounted within the vehicle,
at least one of the elongated body and the web coupling member elastically deforming under dynamic forces applied by the flexible web to the web coupling member to attenuate peak loads in the flexible web.

16. The web position and attenuation apparatus of claim 15, further comprising a first bracket mounted to the one of the first and second ends of the elongated body, the first bracket affixable to the frame of the movable vehicle.

17. The web position and attenuation apparatus of claim 16, further comprising a second bracket mounted to the other of the first and second ends of the elongated body, the second bracket affixable to the frame of the movable vehicle.

18. The web position and attenuation apparatus of claim 15, wherein the elongated body defines opposite sides each extending between the first and second ends of the elongated body, and a width extending between the opposite sides,
and wherein the web slot comprises a linear slot extending transversely across the width of the elongated body.

19. The web position and attenuation apparatus of claim 15, wherein the flexible web is affixed to the frame of the movable vehicle.

20. The web position and attenuation apparatus of claim 15, further comprising a web retractor mounted within the movable vehicle,
wherein one end of the flexible web is coupled to the web retractor such that the flexible web is retractable within and extendable from the web retractor.

* * * * *